(12) United States Patent
Arboletti et al.

(10) Patent No.: US 8,781,882 B1
(45) Date of Patent: *Jul. 15, 2014

(54) AUTOMOTIVE INDUSTRY HIGH PERFORMANCE CAPABILITY ASSESSMENT

(75) Inventors: Ariano Arboletti, Turin (IT); Giorgio Torresani, Milan (IT); Nagendra Palle, Palo Alto, CA (US); Per Segerberg, Kullavik (SE)

(73) Assignee: Accenture Global Services Limited, Dublin (IE)

( * ) Notice: Subject to any disclaimer, the term of this patent is extended or adjusted under 35 U.S.C. 154(b) by 761 days.

This patent is subject to a terminal disclaimer.

(21) Appl. No.: 12/324,150

(22) Filed: Nov. 26, 2008

Related U.S. Application Data

(60) Provisional application No. 61/086,927, filed on Aug. 7, 2008.

(51) Int. Cl.
*G06Q 10/00* (2012.01)

(52) U.S. Cl.
USPC ....... 705/7.39; 705/7.38; 705/7.41; 705/7.42; 705/7.11

(58) Field of Classification Search
USPC .................. 705/7.11, 7.38, 7.39, 7.41, 7.42
See application file for complete search history.

(56) References Cited

U.S. PATENT DOCUMENTS

| | | | |
|---|---|---|---|
| 6,101,479 A * | 8/2000 | Shaw | 705/7.12 |
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,889,096 B2 * | 5/2005 | Spriggs et al. | 700/17 |
| 6,957,186 B1 | 10/2005 | Guheen et al. | |
| 7,937,281 B2 * | 5/2011 | Miller et al. | 705/7.11 |
| 2002/0035495 A1 | 3/2002 | Spira et al. | |
| 2002/0059512 A1 * | 5/2002 | Desjardins | 713/1 |
| 2003/0033191 A1 * | 2/2003 | Davies et al. | 705/10 |
| 2003/0083912 A1 | 5/2003 | Covington, III et al. | |
| 2003/0110067 A1 | 6/2003 | Miller et al. | |
| 2004/0039631 A1 * | 2/2004 | Crockett et al. | 705/11 |
| 2004/0054545 A1 * | 3/2004 | Knight | 705/1 |
| 2004/0098299 A1 * | 5/2004 | Ligon et al. | 705/10 |
| 2005/0154769 A1 * | 7/2005 | Eckart et al. | 707/201 |
| 2007/0050198 A1 * | 3/2007 | Ledford et al. | 705/1 |
| 2007/0094059 A1 * | 4/2007 | Dawkes et al. | 705/7 |
| 2008/0027790 A1 * | 1/2008 | Balz et al. | 705/11 |
| 2008/0208665 A1 * | 8/2008 | Bull et al. | 705/8 |
| 2009/0300577 A1 * | 12/2009 | Bernardini et al. | 717/101 |

OTHER PUBLICATIONS

Kim et al., "sources and assessment of complexity in NPD projects," Blackwell Publishing, R&D management, 33.1, 2003.*

(Continued)

*Primary Examiner* — Jonathan G Sterrett
*Assistant Examiner* — Tzu-Hsiang Lan
(74) *Attorney, Agent, or Firm* — Brinks Gilson & Lione

(57) ABSTRACT

A high performance capability assessment model helps an automotive industry business meet the challenges of the global marketplace. As a result, the automotive industry business can achieve the clarity, consistency, and well-defined execution of core processes that reduce inefficiencies and waste that result from unnecessary process complexity and exceptions. In addition, the high performance capability assessment model helps the automotive industry business to identify specific areas in which improvements may be made and understand how to make the improvements, and establishes levels of capability along the way to reaching an ultimate capability goal.

15 Claims, 9 Drawing Sheets

(56) References Cited

OTHER PUBLICATIONS

Smith et al., "Shortening the product development cycle" Rsearch TEchnology Management; May/Jun. 1992; 35, 3.*
Kim et al., "Product development in the world auto industry" Brookings paper on economic activity, vol. 1987 No. 3, Special issue on Microeconomics (1987), pp. 729-781.*
Hobday, Mike, "Product complexity, innovation and industrial organisation" Economic & Social research council, Cops Publication No. 52, 6, 1998.*
U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.
Non-Final Office Action dated Apr. 28, 2011, issued in related U.S. Appl. No. 12/129,080.
Brochure, "High Performance Acceleration: Global Retail Process Model," Accenture, High Performance Delivered, 2007.
Handbook, Software Engineering Institute, "A Description of the Systems Engineering Capability Maturity Model Appraisal Method Version 1.1," Mar. 1996.
Keith A. Heston, "Achieving Delivery Excellence Using the Capability Maturity Model Integration," *Accenture, High Performance Delivered*, 2006.
Report, Software Engineering Institute, "A Systems Engineering Capability Maturity Model, Version 1.1.," Nov. 1995.
Walker Royce, "CMM vs. CMMI: From Conventional to Modern Software Management," *The Rational Edge*, 2002.

* cited by examiner

| Vision and Strategy 102 | External Analysis 110 | Internal Business Planning 112 |
|---|---|---|

Core Functions 104

| Product Development 114 | Sourcing & Procurement 116 | Production & Logistics 118 | Marketing & Sales 120 | After Sales 122 |
|---|---|---|---|---|
| New Product Development 130 | Procurement Strategy 136 | Production Forecasting Planning and Scheduling 144 | Brand Management 152 | After Sales Parts |
| Engineering 132 | Strategic Sourcing & Category Management 138 | Inbound Logistics 146 | Product & Service Marketing 154 | Forecasting, Planning 166 |
| Product Lifecycle Management 134 | Requisition to Pay 140 | Manufacturing and Assembly 148 | Channel Integration & Management: Direct Channels; and Indirect Channels 156 | Product Design & Mgmt 168 |
| | Supplier Relationship Management 142 | Outbound Logistics: CKD; and Built up. 150 | Product & Service Sales: New Vehicles; and Used Vehicles 158 | Marketing & Sales 170 |
| | | | Customer Relationship Management 160 | Procurement & Inbound Logistics 172 |
| | | | | Warehouse Mgmt 174 |
| | | | | Outbound Logistics 176 |
| | | | | After Sales Service 164 |
| | | | | Service Strategy 178 |
| | | | | Technical Support 180 |
| | | | | Warranty & Recall Campaign Mgmt 182 |

Cross Core Functions 124

| Cross-Functional Planning: BTO; and BTS. 184 | Order Management: BTO; and BTS. 186 | Quality Management 188 | Call Center Mgmt 190 | Remanufacturing and Recycle Mgmt 192 |
|---|---|---|---|---|

Support Functions 106

| Enterprise Mgmt 126 | Financial Mgmt 194 | Human Resources 196 | Information Mgmt 198 | Procurement 200 | Legal Compliance 202 | Enterprise Asset Mgmt 204 | Environment, Health & Safety Mgmt 206 |
|---|---|---|---|---|---|---|---|

Captive Banking Functions 128

AUTOMOTIVE INDUSTRY HIGH PERFORMANCE CAPABILITY ASSESSMENT

CROSS-REFERENCE TO RELATED APPLICATIONS

This application claims the benefit of priority from U.S. Provisional Patent Application Ser. No. 61/086,927, filed on Aug. 7, 2008, entitled Automotive Industry High Performance Capability Assessment, and is hereby incorporated by reference in its entirety.

BACKGROUND OF THE INVENTION

1. Technical Field

This disclosure concerns a system and method to identify the performance capability of an organization on a scale of representative capabilities. In particular, this disclosure relates to an efficient and cost effective way to assess the performance capability level of key assessment areas within the processes of an organization.

2. Background Information

The automotive industry must adapt to an increasingly competitive environment and execute in a clear, consistent, and efficient manner. Furthermore, the global nature of the automotive industry greatly increases the complexity and difficulty of surviving on a day-to-day basis, let alone growing and prospering.

Despite the need for a business in the automotive industry to meet the challenges of the global marketplace, often the business lacks clarity, consistency, and well-defined execution of the core processes of the business. These shortcomings severely constrain the business, and lead directly to inefficiencies and waste due to unnecessary complexity, process exceptions, and customer dissatisfaction. At the same time, identifying specific processes to which improvements may be made can be very difficult, either because the business itself does not have the expertise to identify the processes or because the complexities of the business frustrate attempts to clearly delineate the processes to be improved.

Even if the automotive industry business can identify one of the many processes that need to improve, the business may not know how to improve the process or be able to identify a concrete and measurable improvement goal. Another difficulty exists in determining whether intermediate goals exist that should be reached along the way. As a result, automotive industry businesses struggle to meet the demands of the modern global marketplace and fail to identify opportunities for margin improvement, category expansion, portfolio optimization, multi-channel execution, selling performance, and to reach other important goals.

Therefore, a need exists for an efficient and effective system and method to assess the performance capability level of key assessment areas within the processes of an organization.

SUMMARY

A high performance capability assessment (HPCA) model helps businesses, particularly an automotive business, meet the challenges of the global marketplace by defining a scale of performance capability along which the current practices of the business may be located. The HPCA model accelerates the discovery of process and capability gaps within business operations. In addition, the HPCA model also helps the business to identify specific areas in which improvements may be made, how to make the improvements, and how to establish levels of capability during the course of attempting to achieve an ultimate capability goal. As a result, the business can achieve the clarity, consistency, and well-defined execution of core processes that reduce inefficiencies and waste.

The HPCA model includes a key factor dimension and a performance capability scale dimension. The performance capability scale dimension defines multiple capability levels. The performance capability levels may form a scale of increasing organizational performance capability. One example of such a scale includes a 'Basic' capability level, a 'Competitive' capability level, and a 'Market Leading' capability level. Each performance capability level includes criteria specific to a corresponding key assessment area. Each key assessment area identifies some aspect of a capability of a business.

Capabilities of a business may be grouped into platforms. For example, the HPCA model may group the capabilities of the automotive industry into three high-level platforms, including a vision and strategy platform, core functions platform, and support functions platform. Examples of capabilities within the vision and strategy platform include external analysis and internal business planning. Platforms may include sub-platforms, as well as capabilities. Examples of sub-platforms within the core functions platform include product development, sourcing and procurement, production and logistics, marketing and sales, after sales, and cross core functions. Examples of sub-platforms within the support platform include enterprise management and captive banking functions.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the vision and strategy platform includes performance capability criteria for external analysis and internal business planning key assessment areas at each of the capability levels along the performance capability scale dimension and in each of the key assessment areas along the key factor dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

FIG. 1 shows an example of the high-level platforms that organize capabilities in a performance capability assessment model.

DETAILED DESCRIPTION OF THE PREFERRED EMBODIMENTS

Figure 2:
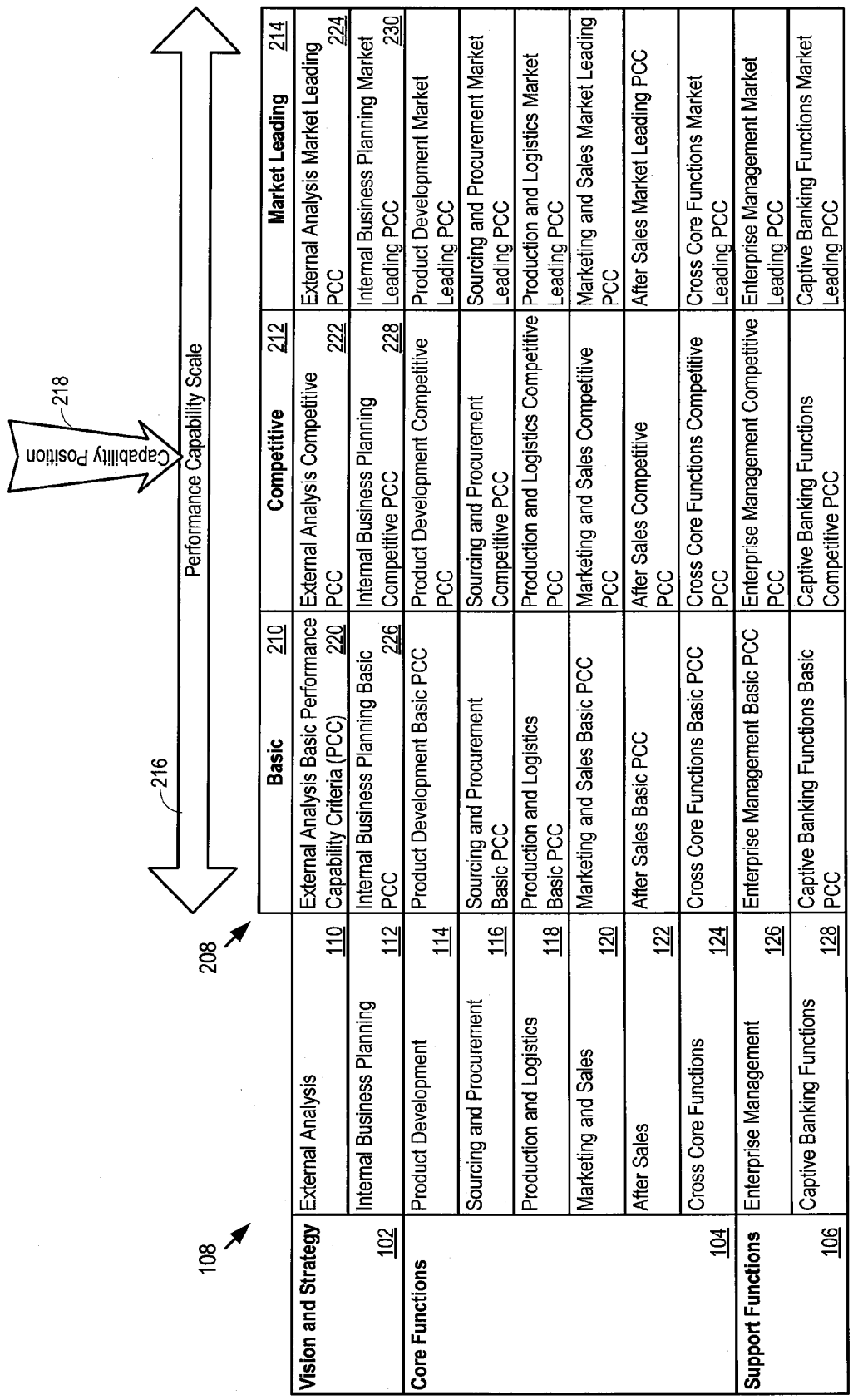
FIG. 2 shows a high performance capability assessment model with a performance capability scale and performance capability criteria.

The HPCA model establishes a multidimensional automotive industry performance reference set that includes multiple key assessment performance reference tables. The key assessment performance reference tables include a 'Basic' performance capability level, a 'Competitive' performance capability level and a 'Market Leading' performance capability level. The 'Basic' performance capability level specifies 'Basic' performance assessment criteria, the 'Competitive' performance capability level specifies 'Competitive' performance assessment criteria, and the 'Market Leading' performance capability level specifies 'Market Leading' performance assessment criteria. The HPCA model receives input data that specifies an automotive industry platform (e.g., an automotive industry area) and an automotive industry key assessment area for analysis. The HPCA model searches the multidimensional automotive industry performance reference set for a matching key assessment performance reference table that matches the automotive industry platform and automotive industry capability within the platform and the automotive industry key assessment area, and retrieves the matching key assessment performance reference table. The HPCA model initiates analysis of the matching key assessment performance reference table to obtain a resultant performance capability level for the automotive industry key assessment area.

FIG. 1 shows a high performance capability assessment (HPCA) model 100. The HPCA model 100 specifies three platforms including vision and strategy platform 102, core functions platform 104, and support functions platform 106. Additional, different, or fewer platforms may be used in other implementations, each platform defining additional, different, or fewer capabilities. Each platform includes one or more capabilities. In particular, the vision and strategy platform 102 includes an external analysis capability 110 and an internal business planning capability 112. The core functions platform 104 includes a product development key platform 114, a sourcing and procurement platform 116, a production and logistics platform 118, a marketing and sales platform 120, an after sales platform 122, and a cross core functions platform 124. The support functions platform 106 includes an enterprise management platform 126 and a captive banking functions platform 128.

Each capability includes one or more key assessment areas. Each key assessment area may include one or more additional key assessment areas. In other words, a business capability may include sub-capabilities, and therefore, key assessment areas corresponding to the multiple sub-capabilities. The product development platform 114 of the core functions platform 104 includes a new product development capability 130, an engineering capability 132, and product lifecycle management capability 134. The tables below show specific criteria used to analyze each capability. The sourcing and procurement platform 116 includes a procurement strategy capability 136, a strategic sourcing and category management capability 138, a requisition to pay capability 140, and a supplier relationship management capability 142. The production and logistics platform 118 includes a production forecasting planning and scheduling capability 144, an inbound logistics capability 146, a manufacturing and assembly capability 148, and an outbound logistics capability 150. The marketing and sales platform 120 includes a brand management capability 152, product and service marketing capability 154, a channel integration and management capability 156, a product and service sales capability 158, and customer relationship management capability 160.

The after sales platform 122 includes an after sales parts platform 162, and an after sales service platform 164. The after sales parts platform 162 may further include a forecasting and planning capability 166, a product design and management capability 168, a marketing and sales capability 170, a procurement and inbound logistics capability 172, a warehouse management capability 174, and an outbound logistics capability 176. The after sales services platform 164 may further include a service strategy capability 178, a technical support capability 180, and a warranty and recall campaign management capability 182.

The cross core functions platform 122 may include a cross-functional planning capability 184, an order management capability 186, a quality management capability 188, a call center management capability 190, and a remanufacturing and recycle management capability 192. The enterprise management platform 126 of the support functions platform 106 may include a financial management capability 194, a human resources capability 196, an information management capability 198, a procurement capability 200, a legal compliance capability 202, an enterprise asset management capability 204, and an environment health and safety management capability 206.

FIG. 2 shows a portion of the HPCA model 100 and multiple capability levels 208. The capability levels 208 establish a scale of increasing organizational performance capability. In FIG. 2, the capability levels 208 include a 'Basic' capability level 210, a 'Competitive' capability level 212, and a 'Market Leading' capability level 214. The HPCA model 100 establishes a performance capability scale 216 along which current business practices may be located and identified with respect to any platform and capability within a platform according to an analysis of performance capability criteria (PCC) (e.g., 220-230).

Table 1 provides an explanation of the external analysis capability 110 and two key assessment areas within the external analysis capability, including a external analysis—customer analysis key assessment area and a external analysis—competitor key assessment area that includes performance capability criteria (PCC) (e.g., 220-230). The capability under evaluation may be assigned a capability level 208 based on a capability position 218 along the performance capability scale 216 (e.g., the 'competitive' capability level 212).

Performance capability criteria (e.g., 220-230) populate the HPCA model 100. The performance capability criteria capture criteria, characteristics, and/or other features of a capability at a particular capability level for a key assessment area. Examples below illustrate performance capability criteria that provide unexpectedly good analysis and benchmarking for automotive organizations. The HPCA model 100 performance capability criteria provide a tool for determining where a platform and capability under examination falls along the performance capability scale 216. For example, process engineers may interview a business or receive data about the business to determine, measure, or otherwise ascertain the characteristics, criteria, and other features of a particular capability implemented within the business. The process engineers may compare the characteristics of the business to the performance capability criteria in the HPCA model 100 and arrive at a capability level 208 for the capability under examination. In doing so, for example, the process engineers may identify where the capability under examination falls in terms of capability level for each key assessment area of a capability and determine an overall position on the performance capability scale 216 for the capability under examination. Performance capability criteria may populate the HPCA model 100 in whole or in part. Multiple high performance capability assessment models may be collected and stored with the performance capability criteria for future retrieval and possible modification in a capability detail pool, discussed below.

TABLE 1

| Vision and Strategy-External Analysis | |
| --- | --- |
| Description: | Analysis in strategic management, assessment of the company strengths, weaknesses and opportunities; Customers and Industry/Markets Analysis |
| External Analysis - Customer Analysis Key Assessment Area (KAA) | |
| Basic Criteria: | Customer Analysis: Segmentation based on customer characteristics such as company size and industry classification No segment-differentiation in Advertising Ad hoc approach to gathering customer information mainly characterized by internal guessing/imagining of customer desires Gathering of general customer information from the average customer Customer information not spread throughout the organization but rather isolated where it was gathered No monitoring of changes in customer desires throughout the development cycle |
| Competitive Criteria: | Customer Analysis: Segmentation based on profitability; segment customers to understand and meet customers' needs (services, prices, and quality) Segment-specific value propositions and strategies Advertising focused on more profitable customer segments Capture Data not always consistently/cleanly: central integrated repository of customer information often missing Customer information shared across functions and used for business planning Lack of continuous improvement in monitoring customer desires based on past data results |
| Market Leading Criteria: | Customer Analysis: Segmentation based on buyer benefits/reasons for buying, (e.g., reliable, low cost earth moving machine), rigorous voice of customer analysis Advertising focused on different segments with different messages Continuous, real time electronic data capture and storage; Structured and facts based approach to gathering customer information with established purposes and objectives; third party partnerships formed to gather data Customer information made accessible throughout the organization, favorably with the help of IT |

TABLE 1-continued

| Vision and Strategy-External Analysis | |
| --- | --- |
| | General customer information complemented with learning from forefront users Continuous monitoring of customer desires and reevaluation of made assumptions/decision. |
| External Analysis - Competitor Analysis Key Assessment Area | |
| Basic Criteria: | Competitor Analysis: Competitor information gathered on an ad hoc basis and isolated in different parts of the organization Tear-down analysis of competitor products identifying functional and quality characteristics No monitoring of changes in competitive situation throughout the development cycle |
| Competitive Criteria: | Competitor Analysis: Competitor information shared across functions Analysis of competitor products identifying functional, quality characteristics and service level opportunities Periodic monitoring of competitor actions and market trends |
| Market Leading Criteria: | Competitor Analysis: Competitor information gathered in a structured way and made available throughout the organization Reversed engineering identifying not only competitor products performance (e.g., functional, quality, and service level) but also cost structure Continuous monitoring of competitor actions, market trends and attractive analysis. Reevaluation of made assumptions/decisions. |

Table 2 provides an explanation of the internal business planning capability 112 within the vision and strategy platform 102. Table 2 further illustrates the internal business planning capability 112 with one corresponding key assessment area that includes performance capability criteria (PCC) for each capability level.

TABLE 2

| Vision and Strategy-Internal Business Planning | |
| --- | --- |
| Description: | Implementation of activities necessary for the company to succeed. Internal Business Planning capability is split into two main processes: Set Business Goals; and Define Business Plan |
| Internal Business Planning KAA | |
| Basic Criteria: | Company focus is on the bottom line The company is driven by function Top Management sets targets (top-down approach) Business goals not spread throughout the organization Companies operate with operational review meetings to assess whether performance is consistent with the annual operating plan Accounting measures do not capture key business changes in time and reflect divisional processes Manager performance is measured on the ability to come in under budget No clear overriding of Product Offering Planning seen as a process of incremental improvement of the existing product lines Aggregate Sales Targets Planning Parameters not driven by the business strategy |
| Competitive Criteria: | Company focus on best total cost, best product, or best total solution, not the bottom line The company is process-driven Integrated, bottom-up approach to planning Business goals and plans shared across functions Time is spent reflecting on whether the organization's strategy is proceeding as expected Performance measures have predictive power and reflect cross-functional processes Manager performance is measured by financial results such as shareholder value but also by non-financial measures such as 'quality' for customer |

TABLE 2-continued

Vision and Strategy-Internal Business Planning

| | |
|---|---|
| Market Leading Criteria: | Product Offering Planning considers market requirements when making product line decisions<br>Sales Targets segment-oriented<br>Planning Parameters driven by business strategy and KPIs<br>Company combines its focus on processes and functions to produce a set of goals specific to each business unit and develops a series of measures in both financial and non-financial areas<br>Involve and integrate individuals from across the organization when developing plans linked to corporate strategy<br>Deviations from the financial plan are resolved before quarterly reviews and the quarterly reviews themselves focus on whether the company is achieving its near-term objectives, whether its long term objectives are going to be realized.<br>A performance management system is instituted to capture the value of assets as well as the ability of those assets to produce wealth in the future<br>Manager performance is measured by the ability to take advantage of competitive opportunities<br>The overriding goal of Product Offering is clear and linked to product development spending and corporate strategy<br>Linkage of product planning and corporate strategy is clear-adherence to plan<br>Segment specific sales target<br>Planning strategy/parameters driven by business strategy and KPIs and periodically reviewed |

Figure 3:
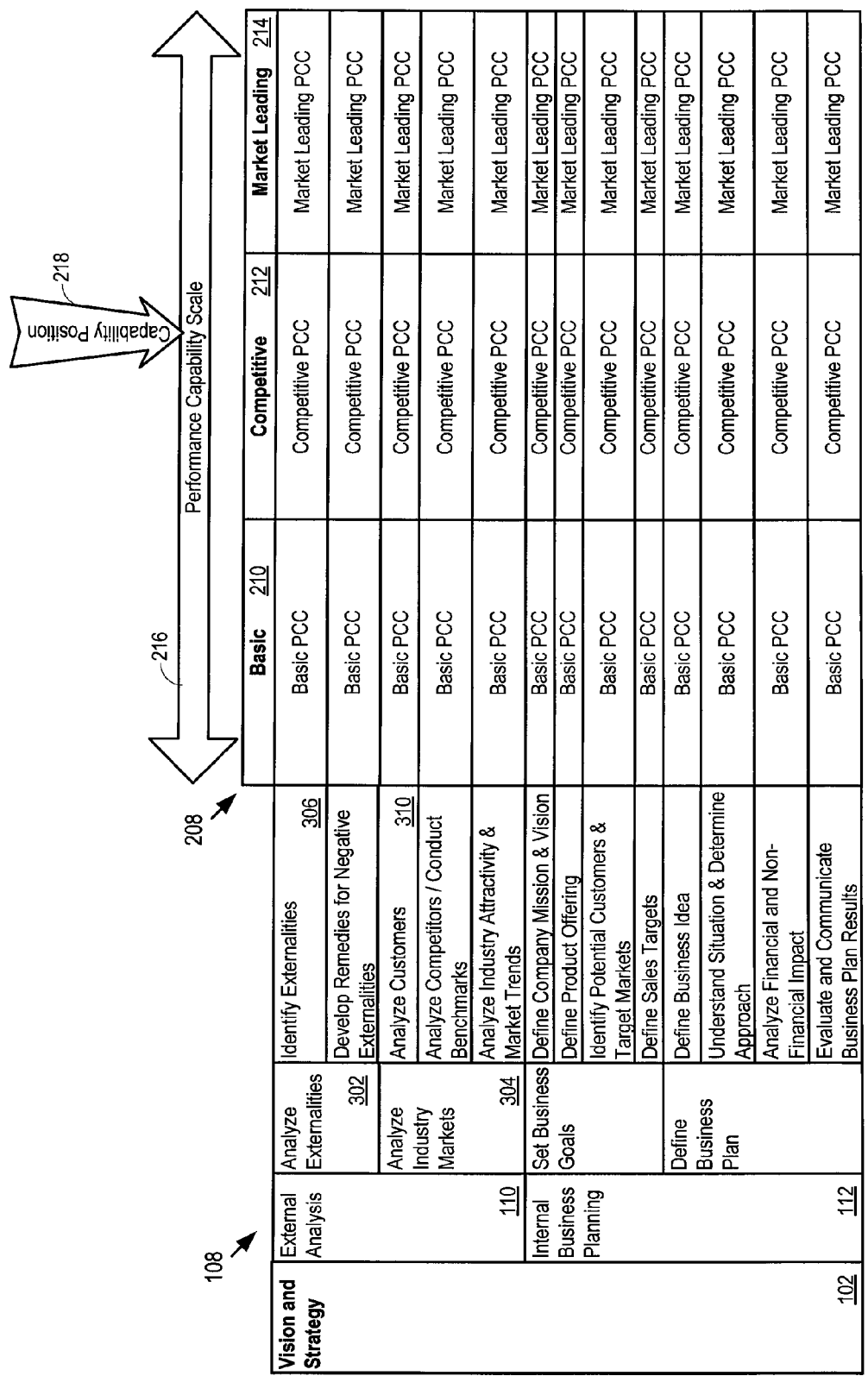
FIG. 3 shows a high performance capability assessment model with three is capabilities within the vision and strategy.

FIG. 3 illustrates that each capability within a platform (e.g., vision and strategy platform 102) may include additional capabilities (e.g. 302-306). In other words, a business capability may include multiple sub-capabilities. For example, FIG. 3 shows the vision and strategy platform 102 with the external analysis key capability 110 and internal business planning capability 112 with additional capabilities. FIG. 3 shows the external analysis capability 110 with an analyze externalities capability 302 that further includes an identify externalities capability 306 and a analyze industry markets capability 304 that further includes an analyze customers capability 310.

Figure 4:
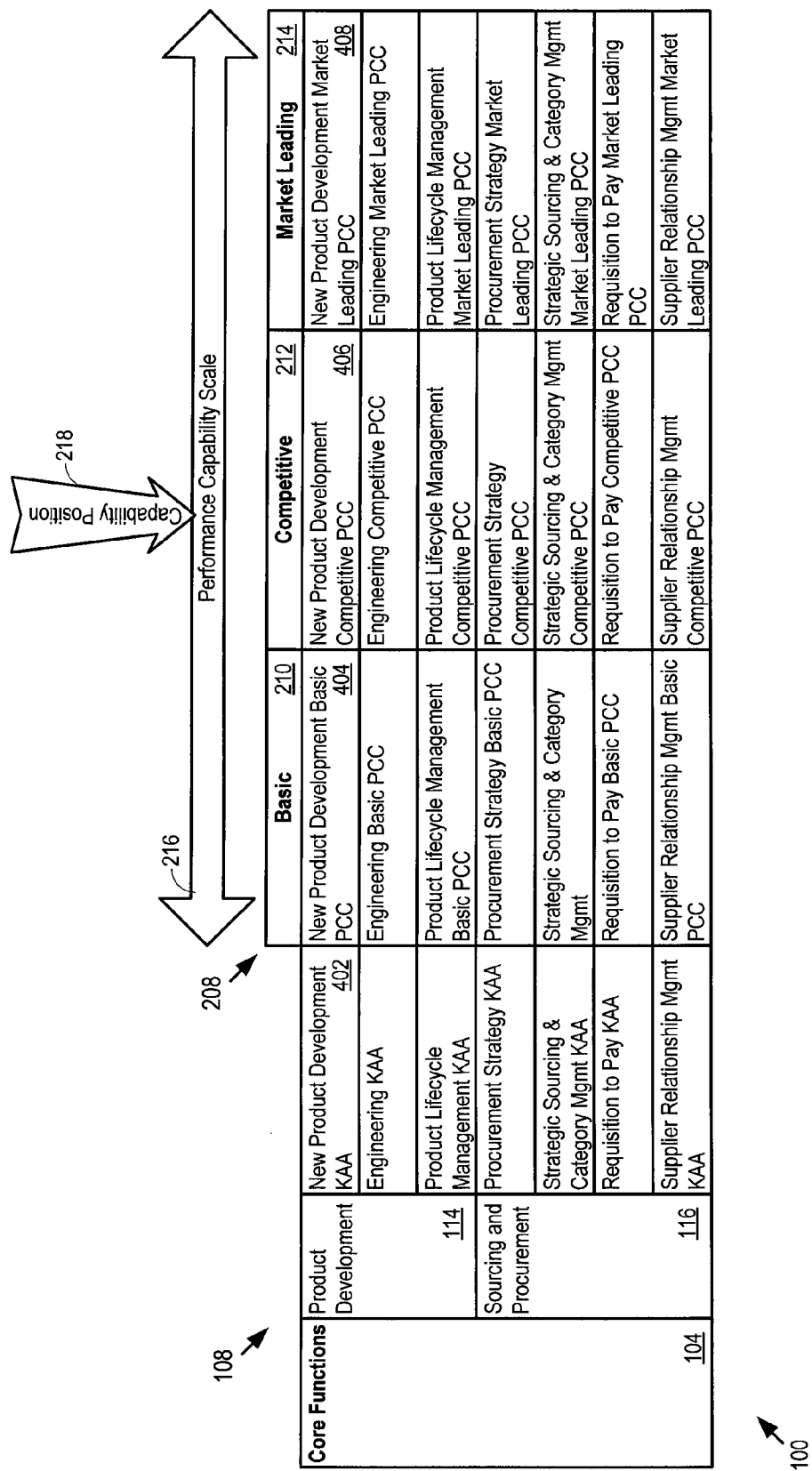
FIG. 4 shows a high performance capability assessment model with external analysis and internal business planning capabilities within the core function platform.

The following Tables 3-33 provide an explanation of the capabilities and corresponding key assessment areas and performance capability criteria for each capability within the core functions platform 104. For example, as shown in FIG. 4, the new product development capability 130 includes a new product development key assessment area 402 that includes new product development basic PCC 404, new product development competitive PCC 406, and new product development market leading PCC 408.

TABLE 3

Product Development-New Product Development

| | |
|---|---|
| Description: | Long term based process to develop new products; adjustment towards new innovation/technology trends and market requirements<br>Includes all processes from product planning towards product ramp-up and production launch (Product Planning, Concept Development, Product and Process Design and Freeze, Prototyping, Manufacturing Readiness, Ramp-up and Vehicle Launch)<br>In addition an overall Program Management needs to be set-up and executed |

TABLE 3-continued

Product Development-New Product Development

New Product Development KAA

| | |
|---|---|
| Basic Criteria: | Ideas generated within functions<br>Ideas generated within geographical boundaries<br>Innovation combine Ideas, development and launch processes with poor linkage and not managed as a single process<br>Innovation is opportunistic, with no clear framework to link innovation with business strategy<br>Ideas progressed with no criteria to guide product development<br>Product performance requirements based on current capabilities and practices<br>Development guidelines based on costs and timings<br>Unclear allocation of resource and priorities, led by most dominant function<br>Project team poorly formed, little ownership of project<br>Project proceeds over long timescale, including time "on hold"<br>Little post launch effort unless major problems emerge |
| Competitive Criteria: | Continuous process with feedback from business to product development activity<br>Ideas generated using internal cross-functional teams<br>Ideas generated across geographical boundaries<br>Innovation combines Ideas and Development and Research, with good liaison and discussion of strategy/priorities, but not managed as a single process<br>Agreed innovation program with clear due dates<br>Ideas progressed to product development using estimated criteria<br>Product performance requirements based on planned capabilities<br>Development guidelines based on business targets<br>Cross-functional contribution of resource, directed at prioritized projects<br>Project team formed early, with clear leadership and ownership of project<br>Project team puts project "on hold" until barriers removed/resolved<br>Post launch review to assess launch success |
| Market Leading Criteria: | Well developed strategic process for progressing new products in context of overall business goals<br>A high volume of ideas from multi-functional internal and external teams<br>Global intelligence networks used and overseas markets systematically scanned for new ideas<br>Innovation viewed as a single process, managed with clear parameters (e.g. innovation, cost, success rate, time to market)<br>Established innovation "funnel" with clear framework for prioritizing innovation efforts<br>Preparing for manufacturing readiness much earlier-even prior to concept development<br>Business targets set with integrated innovation goals linked to shareholder value measures<br>Innovation project team formed and remains in place and accountable beyond each launch<br>Project coordinated through various STOP-GO decision gates; nothing put "on hold"<br>Real-time post launch review, with adjustments to plan in light of learning, competitor reaction and economics<br>Involvement of high level management through a production innovation and development committee<br>Early engagement of program chief engineer |

TABLE 4

Product Development-Engineering

| | |
|---|---|
| Description: | After the set-up of overall product requirements this process is needed to specify the product design - including:<br>Powertrain Design/Chassis Design/Electronic Design/Interior and Exterior Design<br>The high number of engineering changes requires performing multiple tasks that involve different internal departments (e.g., |

TABLE 4-continued

Product Development-Engineering design engineering, process engineering, plant engineering, and logistics) as well as suppliers and the client.
Engineering KAA

| | |
|---|---|
| Basic Criteria: | Most product development carried out in-house<br>"Over-the-wall engineering": results of a functional area passed along the organization<br>Limited use of design and development tools including CAD/CAM, and analysis.<br>Review process is unstructured during development<br>Product development tasks carried out in series<br>Minimal product details recorded during development<br>Product designed with no reference to existing product base or availability of components<br>Assessment by internal personnel only |
| Competitive Criteria: | Engineer's Portal with access to the project planning information and documentation, search and visualization of the product, its structure and change processes<br>Include customers and suppliers in product development<br>People collaborate on design process decisions but aware of their own responsibilities<br>Moderate use of design development tools; product and process definitions created and tested electronically and with several iterations.<br>Cross-functional teams to minimize and focus review process<br>Development tasks carried out concurrently<br>Product designed to use freely available components<br>Fast cycle iterative consumer research and market pilots |
| Market Leading Criteria: | Global management of configuration via an inter company/cross-functional change process enabling global visibility of the impact caused by changes<br>Simultaneous Engineering<br>Use of visualization technology to generate digital mock-ups from different native formats that can be used in virtual design meetings<br>Rotates engineers between vehicle design and manufacturing process design to ensure "designs for manufacturing"; Concurrent Engineering<br>Use integration product teams to define system architecture and drive integration between sub-assembly/component teams<br>Incorporate customers into the design team and Quality function deployment<br>Collaborate with external sources to design and build key product components, wherein Suppliers as strategic partners deeply incorporated into development process<br>Measure quality of raw material, process performance, market prices and transportation costs to take decisions on the purchasing of elementary products<br>Monitor product cost during development to adapt target cost assuring future profitability is achievable<br>Global Engineering Footprint |

TABLE 5

Product Development - Product Lifecycle Management

| | |
|---|---|
| Description: | Business process and technology architecture for capturing and maintaining product information across the entire life cycle, thereby helping companies increase development speed, improve customer satisfaction, optimize operations and create new revenue<br>PLM - capability is split into two main processes:<br>Management of product and process structure<br>Management of Changes<br>Product Lifecycle Management KAA |
| Basic Criteria: | Reactive changes to product, dependent on supply issues/consumer complaints/sales/competitor activity<br>Ad hoc updates to product specifications<br>Monitor life cycle in terms of volume sales and contribution<br>New product development knowledge not spread across the organization |

TABLE 5-continued

Product Development - Product Lifecycle Management

| | |
|---|---|
| | Research and Development systems not linked to enterprise system<br>High Level Management not totally involved in the company trough products innovation and development committee |
| Competitive Criteria: | Proactive changes to product, dependent on supply information/market data feedback<br>Product information maintained in diverse systems (e.g., PDM and Documental ERP).<br>Monitor life cycle in terms of brand equity and category growth<br>Manual process of engineering changes.<br>Lack of integration between the process, the documentation and the product information.<br>No common procedures to manage documentation changes.<br>Project documentation is not synchronize with product information.<br>Knowledge from previous experiences is not reused in new projects |
| Market Leading Criteria: | Improve change management by using a structured and proactive process, dependent on supplier partnership and consumer knowledge<br>Prioritize the introduction of new products or variants depending on market conditions, competitor events<br>Integrated, singular source that enables users to access product information in the appropriate context, such as marketing, Research and development or supply chain<br>Monitor life cycle in terms of consumer loyalty, brand equity and lifetime value<br>Ability to accurately track the performance of a company's complete product portfolio across the life cycle of each product<br>Maintain the system as the single source of information and integrate the change process in the system.<br>Automate the process with collaborative workflows and rules for versions and approval management.<br>Continuously review product portfolio profitability considering cannibalization, overcosts necessary to the introduction of a new product, promotions efficiency<br>Effectively manage retirement of products to reduce manufacturing, logistics and commercialization costs |

TABLE 6

Sourcing and Procurement - Procurement Strategy

| | |
|---|---|
| Description: | Define procurement strategy (Vision, Mission, Core Values) and Procurement Operating Model<br>Define and conduct category strategic planning<br>Identify and manage cross-company sourcing synergies<br>Define and Manage KPI's and conduct performance management<br>Procurement Strategy KAA |
| Basic Criteria: | Sourcing decisions based on customer input and supplier selection<br>Sourcing approach is not consistent with costs, risks and business needs<br>Improvement projects linked to specific business unit goals; Focus on improving procurement department metrics and performance with emphasis on costs<br>Organizations are focused on the first cost for a given product. Cost savings targets are based on desired reductions on these first costs or unit prices<br>Procurement Ops organization do not understand the business strategy; metrics and practices may actually conflict with business strategy |

TABLE 6-continued

Sourcing and Procurement - Procurement Strategy

| | |
|---|---|
| Competitive Criteria: | Individual performance metrics do not exists<br>Unclear differentiation and role of procurement operations staff<br>No leverage of existing contracts or agreements<br>Sourcing decisions based on extended information including customer knowledge and research<br>Sourcing approach is developed but inconsistently applied<br>Improvement efforts begun with focus on large cost reduction opportunities; ERP system reports provide benefits especially in improving processes to enhance benefits<br>A TCO Model is built that takes into account the primary cost drivers associated with material or service, including purchasing, delivery, maintenance, reliability, and disposal costs<br>Business strategy understood by Procurement and Inventory Management personnel, but decisions are made primarily on performance metrics which are functionally driven<br>Some organizational understanding between Category Management and procurement operations but confusion still exists<br>Existing agreements or contracts leveraged |
| Market Leading Criteria: | Sourcing decisions based on category strategy developed from detailed industry, supplier and category intelligence and in-line with corporate strategy<br>Level of sourcing effort and approach is properly aligned with costs, risks and business needs<br>Procurement Operations has an improvement model that is continually researching best practices and applying them to its business model<br>Buyers use TCO model and market knowledge to reduce costs<br>Organization developed to support the business strategy (e.g. fit for purpose) with procurement operations metrics cascaded from the business metrics<br>Clearly communicated and understood differentiation/criteria of sourcing between Procurement Operations and Category Management<br>Detailed process to consistently check for and leverage existing global, Opco and regional agreements |

TABLE 7

Sourcing and Procurement - Strategic Sourcing and Category Management

| | |
|---|---|
| Description: | Manage and Conduct New Product Development Sourcing<br>Manage and Conduct Strategic Sourcing/Resourcing<br>Strategic Sourcing and Category Management KAA |
| Basic Criteria: | A database of suppliers for components provides input for purchasing decisions; The buyer makes decisions based on price and delivery on a case by case basis<br>Supplier selection criteria based on price and quality<br>The supplier relationships within each category are at a transactional level - contracts may be in place, but little thought is given to the desired relationship with the category's supply base<br>Sourcing process executed manually. Variations in the process exist across business units<br>No negotiation training available for procurement personnel<br>"Should Cost" models not understood/known by the organization |
| Competitive Criteria: | Recognition of opportunity for integrated supplier management and development of initial purchasing strategy; Aware supplier base is too big and a rationalized approach may yield significant benefits<br>Reduced number of suppliers selected by strategic Key Performance Indicators (KPIs); activity based on actual costing<br>Consideration is given to the degree to which the category should be transaction-based or relationship-based |

TABLE 7-continued

Sourcing and Procurement - Strategic Sourcing and Category Management

| | |
|---|---|
| | Parts of the sourcing process are supported by internal applications, but are not linked together. Procurement personnel rely on their knowledge and personal experience to get the information they need<br>Fact based negotiation training available, according to budget<br>"Should cost" models based negotiation inconsistently applied |
| Market Leading Criteria: | Strategic sourcing program developed to support business mission and objectives; "Pantry Approach" established for product development and procurement needs<br>Reduced number of suppliers selected by strategic Key Performance Indicators (KPIs) with emphasis placed on supplier's willingness/ability to develop long-term strategic relationship<br>Categories are assigned a general procurement strategy based on the desired point on the transaction/relationship continuum<br>eSourcing application promotes consistent use of sourcing best practices across organization, improves collaboration and decision-making on sourcing activities, and increases the efficiency of the sourcing process<br>Fact-based negotiation training is required.<br>Negotiations are based on accurate "Should Cost" models |

TABLE 8

Sourcing and Procurement - Requisition to Pay

| | |
|---|---|
| Description: | Requisition to Approval<br>Approval to Order<br>Order to Receipt<br>Receipt to Payment<br>Requisition to Pay KAA |
| Basic Criteria: | Needs are procured as requests are made<br>No understanding of drivers of demand<br>Requisition to pay process is not integrated, little or no process automation available<br>Orders are not automatically generated and require manual order entry and monitoring<br>Strategy for procurement methods (e.g., P-Cards, eProcurement, Automated PO/SO) is not defined or sufficiently known by the organization<br>Limited knowledge of ecommerce; Buyers use supplier website to collect information and specifications<br>Approval processes exist but are not always followed |
| Competitive Criteria: | Needs are reviewed with end user to understand purchase frequency<br>Some consideration to drivers of demand<br>Requisition to pay process is not fully integrated and automated and requiring the use of multiple systems<br>Orders are manually entered into system but detailed management reporting of reorders is available<br>Various procurement methods are defined and loosely tied to spend/suppliers but not sufficiently understood by the organization<br>Multiple procurement methods are used with the same supplier<br>eProcurement software linked to ERP is being used to streamline the transaction process<br>Approval processes and controls are in place but no compliance monitoring |
| Market Leading Criteria: | Forecasts for materials and services are developed and reviewed with end users to align organizational demand, optimize frequency of purchases, and determine substitutes<br>RtP process is fully integrated and standardized<br>Processes are fully automated across all the spend base for all spend segments (Direct, Indirect, Services, Capex)<br>Orders are automatically generated by system replenishment rules (no maverick/tactical purchasing) |

TABLE 8-continued

Sourcing and Procurement - Requisition to Pay

High percentage of spend is being procured through the appropriate method. Channel is inclusive of P-Cards, eProcurement, Automated PO, .etc and is understood by the organization
Automatic replenishment with selected suppliers (utilizing middleware systems to link supplier ERPs to Company systems)
Formal compliance management process in place
Outsourcing basic RtP processes, e.g. payment and audit functions to unlock Value

TABLE 9

Sourcing and Procurement - Supplier Relationship Management

| | |
|---|---|
| Description: | Manage supplier relationship
Manage supplier performance (e.g. Quality) and joint improvement projects
Manage contracts and supplier compliance
Manage supplier integration and development
Supplier Relationship Management KAA |
| Basic Criteria: | No segmentation of existing supply base
Performance is monitored based on selected terms of the agreement (e.g., price)
Buyer keeps track of some suppliers' performance; No consolidated performance metrics
No formal or scheduled feedback takes place with suppliers. Supplier is contacted only when a problem occurs.
No feedback is captured or utilized to support category management
No central, single location for contracts storage. Contracts are stored in hard copy |
| Competitive Criteria: | Importance of key suppliers is recognized and reflected appropriately
KPIs are linked to business unit objectives with focus on select areas such as delivery quality, material/service order completion, order fulfillment, and timeliness
Supplier Performance tracking strategy is in place
Specified feedback is shared with individual suppliers. Feedback is tied directly to business goals
Contracts are stored centrally and electronically imaged but no capability to report against key fields on contracts such as expiration dates |
| Market Leading Criteria: | Suppliers are grouped into three different segments: key, potential, and transactional. Goals, work and management processes are defined accordingly
Suppliers are measured on all KPIs required to ensure the objectives are met including delivery accuracy, quality monitoring, compliance with other contract terms, innovation, flexibility, and problem responsiveness.
Automated tracking of Supplier Performance and Compliance and communicated to supplier (e.g., up to supplier real time access to KPIs); Continuous improvement programs developed with selected suppliers
Supplier feedback is provided to support category management
Single contracts database and system to provide visibility and aid management of contracts.
Electronic repository includes pricing, terms and conditions, insurance certificates and allows for maintenance and reporting against contract expiration dates |

TABLE 10

Production and Logistics - Production Forecasting, Planning and Scheduling

| | |
|---|---|
| Description: | Define and agree production plan
Plan material requirement and develop supplier collaboration
Plan Capacity |

TABLE 10-continued

Production and Logistics - Production Forecasting, Planning and Scheduling

Fix production schedule
Production Forecasting, Planning and Scheduling KAA

| | |
|---|---|
| Basic Criteria: | Manual planning in monthly time periods with no simulation capability
Planning process is reactive due to limited information and visibility of future demand
Batch production reporting
Manual handling of production orders
Systems not integrated across multiple-plant environments
Raw materials purchasing based on competitive bids versus relationships
Little or no advanced technology used to interface with suppliers or in materials planning
Detailed operations scheduling is labor-intensive and inflexible; unit operation sequencing is typically fixed or not optimized; production operations typically focus on freezing schedules for several weeks
Downstream fulfillment constraints (warehouse, shipping, etc) are not considered
Production Scheduling is not linked with the Order delivery date calculation (ATP) |
| Competitive Criteria: | Allocations modified daily to distribute across orders and forecasted demand
Planning is done for multiple time horizons with varying time buckets and product levels
Primarily driven by demand-based (pull) scheduling techniques
Finite capacity planning/scheduling front-end tools
Key suppliers are incorporated into planning process, forecast shared - JIT
Supplier-managed purchased inventories, EDI for purchase orders
MRP tools used to plan 3 to 6 month time horizons
Operations scheduling is comprised of unit operation sequencing and variable process routing, based on order requirements; scheduling changes can be dynamically made but still typically manually executed
Basic fulfillment constraints are considered (e.g., warehouse schedule)
Aggregate Production Scheduling input is provided periodically to Order delivery date calculation |
| Market Leading Criteria: | Simultaneous allocation and planning optimization of capacity, distribution and materials
Integrated systems for all stages of production linked to inventory and materials planning
Production schedules integrated with supplier to support JIT-JIS sourcing
Segmented and optimized supplier relationships over product lifecycle
EDI for purchase orders, manifest, invoice, shipping notice - "paperless transactions"
Operations scheduling is real-time, supported by simulation capabilities; system support provides recommendations on optimized scheduling with user input; changes are automatically executed
Fulfillment constraints are factored into optimization (e.g., truck arrival time, and warehouse storage locations)
Near real-time Production Schedules are electronically linked with Order delivery date calculation with the ability to allocate capacity to a customer |

TABLE 11

Production and Logistics - Inbound Logistics

| | |
|---|---|
| Description: | Plan, schedule and manage inbound transportation and track receipts
Manage shipments and Just In Time
Manage and confirm inbound material quality
Manage and optimize inbound Inventory and Logistics |

TABLE 11-continued

Production and Logistics - Inbound Logistics

Inbound Logistics KAA

| | |
|---|---|
| Basic Criteria: | Responsibility and authority not clearly defined
Developed based on carriers' needs
Limited communications with suppliers/carriers for in-transit status (updates via phone and e-mail)
First come-first served
Inconsistent materials issuing process, filling counter requests, and paper forms
Trucks arrive randomly at the facilities for both inbound and outbound movements
Manual paper based receiving; key-in of inbound receipts from receiving
Manual and paper-based delivery confirmation - prone to errors and misplacement
Inspection deferred until installation or usage |
| Competitive Criteria: | Responsibility beginning to be defined, mix of corporate and local level involvement
Sourcing requirements developed based on business unit requirements with emphasis on first cost
Regular status reporting with suppliers/carriers for in-transit status
Issuing based on informal priority list.
Consistently used process for material issuing with electronic forms linked to the ERP
Time windows are established for inbound and outbound movements
Advance notification of packing slip. Inbound shipments are located in item number sequence
Field uses standardized tools and manual processes to manage receipts in the field. Receipt is matched against the PO
Critical items are inspected prior to shipping with defined tolerances. Non-critical items are tested via random sampling |
| Market Leading Criteria: | Clearly defined roles and responsibilities for managing logistics
Comprehensive contracts with SLA developed to meet business unit requirements
Coordinated process planning at an enterprise level that manages the process not the transaction
Implement stable schedule as early as possible to optimize routing and trailer cube utilization
Dynamic design of network to drive modal optimization (ERP integrated)
Scheduling is automated and delivery windows are scheduled to the half hour
Advanced Shipment Notification allows for pre-receipt of items
Automated receiving and tracking capability (e.g., bar coding, use of scanners, global positioning system, and RFID)
Critical items are inspected through a formal QA process that includes the supplier. Items are inspected throughout the manufacturing process |

TABLE 12

Production and Logistics - Manufacturing and Assembly (1/2)

| | |
|---|---|
| Description: | Define and Agree Detailed Production Scheduling and Sequencing
Manage Material, Manpower and Services
Manage Manufacturing, Assembly and Testing Vehicles
Manage Maintenance Operation
Manufacturing and Assembly (1/2) KAA |
| Basic Criteria: | Local manual SPC via spreadsheets. Batch production reporting
There is a manufacture to stock policy with relatively high stock levels along the supply chain for stock-out avoidance;
Inventory levels are monitored quarterly or monthly
Little segmentation of demand, service levels not well defined |

TABLE 12-continued

Production and Logistics - Manufacturing and Assembly (1/2)

| | |
|---|---|
| | Schedule is produced without reference to labour and equipment availability
Specialized, fixed workforce; "Lip-service" investment in training and continuous improvement methods
Manufacturing process is geared towards long production runs/few changeovers, and characterized by stockpiling to cover forecast errors |
| Competitive Criteria: | Sensor-based process monitoring, automated SPC. Plant-wide production data integration
There is a manufacture to demand policy, with stock limited to contingency levels;
Inventory levels are monitored weekly or daily
Customers segmented by service level requirements, but costs, measures not determined
The schedule integrates both labour and equipment
Flexible workforce aligned with workload; self directed teams aligned with incentives and training to drive improvement
ABC categorization of products recognizing common supply chain characteristics, and application of a different production philosophy to each group |
| Market Leading Criteria: | SPC integrated with distributed PCS. Production data visibility, control integrated with MES
Joint manufacturer/customer policy for inventory with one days stock and JIT manufacturing; quick response centers for key customers and a manufacture for postponement policy; Inventory is managed in real time and quantity and location is known at all times
Direct shipments account for a major portion of sales reflecting continuous replenishment and vendor managed inventory agreements
Processes and measures developed to balance capacity utilization and working capital with cost-to-serve
Electronic Kanban (Internal and external) and projected pull system
Multi-skilled and self-directed work teams
Highly flexible and efficient manufacturing process geared towards rapid set-up changeovers, short frequent production runs, product "pulled" through the supply chain |

TABLE 13

Production and Logistics - Manufacturing and Assembly (2/2)

| | |
|---|---|
| Description: | Define and Agree Detailed Production Scheduling and Sequencing
Manage Material, Manpower and Services
Manage Manufacturing, Assembly and Testing Vehicles
Manage Maintenance Operation
Manufacturing and Assembly (2/2) KAA |
| Basic Criteria: | Operating standards set once a year as part of budget process
Statistical Quality Control off-line
Schedules for maintenance efforts managed at the field office level, utilizing local application support
Documentation managed in informal libraries, not often kept current with changes. Databases for service history maintained but not routinely analyzed for trends
Little predictive maintenance technology installed |
| Competitive Criteria: | Operating standards revised quarterly
On-line process and product quality control and certification and costs of quality measures used
Preventive Maintenance programs treated as a priority, with database-driven tracking tools and paper logs
Formal libraries of OEM procedures maintained in field office and kept current. Service and failure database utilized to produce performance reports.
Predictive maintenance technology exists at some regional/site levels and technical support utilized in the problem isolation process |

TABLE 13-continued

Production and Logistics - Manufacturing and Assembly (2/2)

| | |
|---|---|
| Market Leading Criteria: | Operating standards revised on a "need to do" basis<br>Quality is everyone's responsibility<br>Formal preventive maintenance programs are supported with committed and specialized applications, integrated with other service mgt. applications<br>Preventive scheduled activities electronically managed to monitor solutions and advice on required services and upgrades. Failure trends identified through service history.<br>Predict failure by statistical analysis of historical service and failure information.<br>Monitors and sensors predict potential failures on critical equipment and automatically generated service requests |

TABLE 14

Production and Logistics - Outbound Logistics

| | |
|---|---|
| Description: | Plan, Schedule and Manage Outbound Transportation<br>Manage Shipping<br>Manage and Optimize Outbound Inventory and Logistics<br>Outbound Logistics KAA |
| Basic Criteria: | Large number of carriers; developed based on carriers' needs; paper based process<br>Rates based on cost, limited requirements analysis and traditional transaction relationship with carriers<br>React to customer orders in short time horizon. Manual sorting of vehicle load<br>Continuous move opportunities are not considered when planning shipments; Inbound not considered<br>Routes seldom reviewed on an ongoing basis<br>Manual customer schedules based on "intuitive" judgment<br>Shipment plan is based on the next transaction only; schedules reviewed for "crisis" times and changed to reflect short-term fluctuations<br>Limited communication with carriers for in-transit status (e.g., updates via phone and e-mail)<br>Manual routing and limited tracking mechanisms in place to follow progress of international shipments<br>Financial/operating cost responsibility not clearly defined; monitor aggregate costs of the carrier including claims<br>No defined quality process; carriers do not participate in quality driven initiatives |
| Competitive Criteria: | Some carrier rationalization, introduction of core carrier programs, standardized on a few contracts<br>Rates based on service and cost, understanding of past volumes and future requirements. Vehicle loads automatically generated from product/pallet information<br>Beginning to work with customers to develop planning horizons<br>Some coordination between inbound and outbound loads to a facility<br>Manual effort but guided by established parameters; rudimentary transportation/optimization systems<br>Longer planning horizons being implemented; planning, control, and execution are decentralized and executed by empowered individuals<br>Regular status reporting with carriers for in-transit status<br>EDI transmission of delivery schedule and Broker consolidation to offer system-wide shipment view<br>Financial/Operating cost responsibility defined; identify and monitor costs by lane and mode including insurance claims, damages by products and capturing customer and product cost data<br>Carriers participate in some phases of the quality programs |
| Market Leading Criteria: | Minimum number of core carriers to meet business needs; develop custom contracts designed to simplify requirements<br>Strategic transportation service procurement, based on core carrier concept, focused on measuring service performance, costs, capacity, available value added services, leveraging bid analysis tools. Loads include maximizing vehicle utilization<br>Proactively work with customers to develop mutually beneficial planning horizons |

TABLE 14-continued

Production and Logistics - Outbound Logistics

| | |
|---|---|
| | Globally striving to leverage equipment for continuous moves across the sector using available technology<br>Computer-aided simulation of different scenarios to determine impact on fleet and customer service.<br>Coordinated process planning at an enterprise level that manages the process not the transaction. Partnering with customers/suppliers to reduce costs and improve service - "win-win"<br>Network mgt tool used to establish parameters, EDI or web links to share real time information on requirements and capacities. Network optimized to meet long-term plans<br>Centralized and automated rule-based, dynamic routing and scheduling and International shipments rates and tracking are aided by use of 3rd party real time services<br>Financial/Operating cost authority given to people with responsibility; Identify and monitor costs to both customers and products, including carrier costs, claims, delays, storage and handling<br>Fully development TQM process developed into transportation |

TABLE 15

Marketing and Sales - Brand Management

| | |
|---|---|
| Description: | Increase the product perceived value to the customer and thereby increase brand franchise and brand equity<br>Brand Management capability is split into two main processes:<br>Management of brand positioning<br>Management of brand portfolio<br>Brand Management KAA |
| Basic Criteria: | No brand definition<br>No segmentation established<br>Limited customer segmentation: segmentation around manufacturer's product lines, customers classified on the size of their account<br>Customers importance based on current sales and internal sales forecasts for the year ahead<br>Customer Segmentation Analysis based on product purchase behavior; info used primarily for promotions and targeting<br>Branding effort spread across the portfolio largely on basis of last year<br>Marketing program based around communicating intangible benefits<br>Leverage brand in same category with line extensions<br>Market Opportunity Assessment results not well integrated with overall business planning |
| Competitive Criteria: | Brand includes name and logo<br>Intuition-based segmentation<br>Customers divided into a few macro groups based around financial criteria<br>Customers importance based on current sales, forecasts for the next 3/5 years and a broad understanding of customers competitive position in its own markets<br>Customer analysis calculates current customer profitability across all product lines and brand portfolio<br>Strategic resource allocation, separation between brands being milked for cash and power brands for future profit<br>Value proposition of the product covering wide range of benefits underpins brand marketing program<br>Leverage brand into new categories with new product introductions<br>Market Opportunity Assessment regularly performed and results somewhat integrated with business planning |
| Market Leading Criteria: | Brand includes total experience<br>Fact-based segmentation<br>Customers divided into several micro groups based on customer needs and many financial and non-financial criteria<br>Customers importance based on existing and potential sales and profitability determined by a detailed analysis of the customer industry and competitiveness |

TABLE 15-continued

Marketing and Sales - Brand Management

Segmentation analysis used as primary input for developing/defining new products/service offerings and for increasing brand equity
Focus on power brands that drive innovation and that can be leveraged across categories
Definition of functional, psychological and sensory value proposition for each brand as a basis for a category marketing plan
Leverage brands into new markets
Ensuring that all functions deliver the same branded experience, training all front-line people completely and effectively, and reinforcing the brand promise consistently across campaigns
Identification of sources of competitive advantage (e.g., Porter Five Forces; SWOT Analysis); understanding what services/products the company needs for its own brand portfolio improvement

TABLE 16

Marketing and Sales - Product and Service Marketing

| | |
|---|---|
| Description: | High performance marketing has emerged as a key value lever because marketing to consumers is more critical, complicated, and costly than ever<br>To maintain growth and customer loyalty in a competitive environment, leading companies are recognizing the need to improve Service and Service Parts Management capabilities.<br>Product and Service Marketing KAA |
| Basic Criteria: | Product focused merchandizing - Focus on individual products<br>Standard product range offered to customers<br>Expert on company products/brands and familiar with company research<br>Portfolio reviewed annually based on volume and value<br>Lack of relationship between manufacturer's customer/consumer strategies<br>Manufacturer produces special packs for consumers.<br>Special packs over-produced<br>Blanket consumer promotion<br>Advertising spend spread across portfolio<br>Traditional 13-15% commission for the agency<br>Tactical promotions to boost short term sales and customer margin<br>Little feedback and analysis of promotions |
| Competitive Criteria: | Consumer targeted Marketing - Broad customer profiles and targeted assortments<br>Standard product range with some ad hoc product range tailoring to customer requirements<br>Expert on indication specific brand usage versus consumer requirements<br>Product portfolio reviewed based on volume and profit return on an ongoing basis<br>Tailored promotional activity<br>Target promotions with reduced complexity which encourage brand switching. Multipacks unlikely to be featured due to re-packing costs and huge volatility and complexity<br>Blanket promotions tailored to accounts<br>Clear attempt at strategic resource allocation; separation between growth brands and those that are being milked for cash<br>Cost plus based fees with an incentive clause<br>Promotions to enhance penetration and usage rather than volume<br>Promotion performances based on volume and allocated costs |
| Market Leading Criteria: | Consumer Centric Organization - Behaviour-based customer insight driving all marketing, merchandising and operational functions<br>Completely customized product selection offered to the customers |

TABLE 16-continued

Marketing and Sales - Product and Service Marketing

Category experts, knowledgeable about key consumers, product, category and cross-category trends and issues
Portfolio managed in relation to profit contribution to company with category strategy linked to company profitability and complexity management
Mutually agreed promotional strategy that benefits supply chain and meets consumer needs
Manufacturer postpones finishing special packs until as close as possible to actual order to avoid residual stocks. Packs design to enabe them to be returned to standard stock
Volumes allocated to accounts for a given timer period. Outside of the agreed time span stock cleared or re-allocated immediately
Performance based compensation
Post promotion evaluation and measurement against original objectives conducted by person responsible for actual activity

TABLE 17

Marketing and Sales - Channel Integration and Management

| | |
|---|---|
| Description: | Channels are routes to market (direct/indirect) and methods for interaction<br>Channel approaches vary based upon degree of interaction and importance of the buyer to the seller<br>Interaction methods support various routes to market and share customer data to provide seamless support<br>Channel Integration and Management capability including: management of network strategy/sales channels and network development<br>Automotive OEMs focused on: direct channels (OEM experience worlds/internet); indirect channels (dealers, wholesalers)<br>Channel Integration and Management KAA |
| Basic Criteria: | Channel strategy - Operates through a single channel<br>Channel Synchronization - Not considered<br>Interaction Process Mgmt - Manual processes with limited support documentation; inadequate systems support and standardization<br>Brand and channel strategies largely separate<br>Focus on existing accounts to meet current demand<br>No channel analysis conducted<br>Small number of distribution channels<br>Introduction of new channels is on reactive basis without evaluation of applicability to industry, brand and customer segments |
| Competitive Criteria: | Channel Strategy - Limited use of additional channels, inconsistent treatment of customers across channels<br>Channel Synchronization - Integration not consistent or automated<br>Interaction Process Mgmt - Closed loop business processes in place; use of limited work flow mgmt tools to support processes<br>Brand and channel strategies developed in parallel<br>Focus on maximizing existing channel volume via existing and new accounts<br>Regularly evaluation of potential sales and delivery channels<br>Variety of distribution channels<br>Emerging awareness of actual customer needs and understanding of full operational costs<br>Channel strategies often based around "what competitors are doing" |
| Market Leading Criteria: | Channel strategy - Operates in multiple, integrated channels<br>Channel Synchronization - Cross-channel integration of systems, processes and logistics<br>Interaction Process Mgmt - Closed loop business processes with customer experience focus in place: nearly all processes standardized<br>Develop integrated channel and consumer brand strategies with channel specific innovation |

TABLE 17-continued

Marketing and Sales - Channel Integration and Management

Focus on stimulating demand via new channel development
Usage of channel maps - useful way to visualize how each segment will be served
Integrated, multi-channel strategy based on analytical insights, profitability and customer usage activity
Variety of distribution channels aligned to business needs, personalized and focused on providing point-of-need services
Channel conflict strategy matrix used to analyze forces and opportunities for change within the industry by each existing channels and to identify strategies for shedding non-performing channels or adopting new ones
Create partner to recruit and train the right partners to provide higher margin and specialized services

TABLE 18

Marketing and Sales - Product and Service Sales

| | |
|---|---|
| Description: | Forecast and Plan Sales<br>Manage Customer Prospects, Inquiries and Acquisition, Connect Advertising and CRM<br>Manage Country Support and Sales Organization<br>Manage Orders (new vehicles) and Buy Back Programs (used vehicles)<br>Product and Service Sales KAA |
| Basic Criteria: | Customer input primarily through sales organization/verbal feedback<br>Sales people responsible for developing the forecast and rewarded on their ability to achieve forecast; forecast accuracy not measured<br>Customer complaints logging for information. Often separated from marketing<br>Order received by phone/fax; customer requirements captured into a paper-based design<br>Orders allocation on a first come first served basis<br>Time between delivery and invoice >5 days<br>Order tracking system: manual and inaccessible to customers; backorders tracked manually |
| Competitive Criteria: | Customer specific input to base forecasts and aggregated to total company<br>A formal internal cross-functional team periodically reviews/agrees forecasts and forecast accuracy at product code level<br>24-hour helpline for services with "valued consumer" priority linked to marketing<br>Orders received via EDI; order capture direct into mainframe/personal computers via phone/fax (manual)<br>Orders allocation per customer importance/size<br>Time between delivery and invoice <5 days<br>Order tracking system: automated and visible throughout the organization but not to the customers; some utilization of the Internet |
| Market Leading Criteria: | Customer supplies forecast directly via EDI into Forecasting System<br>Segment specific sales strategies, aligned with business plan and objectives.<br>Total service culture with immediate on-line computer generated response, ownership of the problem, empathy with customers<br>Flexibility to move to vendor managed inventory ordering (EPOS); order capture direct into mainframe/personal computer via phone/fax (automatic)/web<br>Orders allocation conducted on a plan replenishment basis after consultation with customer<br>Time between delivery and invoice is the same day<br>Order tracking system: automated and real-time visible throughout the organization and to customers; utilizing the Internet |

TABLE 18-continued

Marketing and Sales - Product and Service Sales

Tightly integrate performance management and development/training to help proactively identify needs and build capabilities.
Sales success managed and tracked electronically - results tracked from the point of initial contact through to the closed sale
Dedicated representatives assigned to premium customers.
Ability to "bundle" different service offerings into one customer-specific solution.
Off load non-value added activities (e.g., Order Entry) to add time to selling activities - use online or 3rd party models - differentiate by segment.
Sales force provided with customer insight information to clearly understand which customers are the higher-value customers.
Sales tools provide timely account/lead information, automated pricing and configuration capabilities, historical quote storage, and automatic proposal generation

TABLE 19

Marketing and Sales - Customer Relationship Management

| | |
|---|---|
| Description: | Build a customer-centric strategy, improving long.-term growth and customer satisfaction<br>Manage strategy, operational processes and business functions in order to retain customers and increase customer loyalty and profitability<br>Manage Relationship with customers, including capture, storage and analysis of customer information to meet customer needs and match them with product offerings<br>Customer Relationship Management KAA |
| Basic Criteria: | No systematic access to customers' market data or consumer profile data<br>Understanding of customer markets is based on sales history/general macro economic measures<br>Collection of customer data on complaints and sales<br>Customer complaints logging for information. Often separate from marketing<br>Legal approach to complaint resolution and complaints usually disputed<br>Helpful staff but little access to information or discretionary powers<br>No customers classification on the basis of volume and gross margin profitability<br>No customer Pareto analysis<br>No segment specific strategies |
| Competitive Criteria: | Broad understanding of customers' category and consumer data as basis for brand and account plans<br>Understanding of customer markets is based on sophisticated knowledge developed in-house with little customer input<br>Customer data on complaints/sales with access other than by account used in decision making<br>24-hour helpline for services with "valued consumer" priority linked to marketing<br>Complaints management system with reparations made for valid complaints<br>Customer focus in all aspects of training<br>Product and customer Paretos often not analyzed together |
| Market Leading Criteria: | Customer data from third parties and alliances; customer information used to derive knowledge about market trends, patterns, and potential behavior; full integration and maintenance within the data warehouse.<br>Customer segmentation is conducted regularly and based on value drivers; these segments are managed to maximize both the benefits to customers and long-term profit potential |

TABLE 19-continued

Marketing and Sales - Customer Relationship Management

| | |
|---|---|
| | Detailed understanding of demand drivers is developed with customers and implications of market conditions are understood and incorporated into the planning system |
| | Extensive customer data including historical and projected sales, complaints, images of all correspondence, photo image of customer used at strategic and operational level |
| | Use of consumer complaints data and panels to feed New Product Development |
| | Total service culture with immediate on-line computer generated response, ownership of the problem, empathy with customers and "get back as promised" features |
| | Ability to capture customer insights across interaction mechanisms (phone, email, web); track relevant information/behavior/metrics/interactions to create a 360 degree view of customer (e.g. surveying demographics, preferences, feedback, and electronic channel data) to better understand/target customer profiles |
| | Ability to develop customer profiles to drive differentiate product/solution offerings |

TABLE 20

After Sales - After Sales Parts
Forecasting, Planning

| | |
|---|---|
| Description: | Estimate future sales<br>Manage inventory planning and replenishment<br>Define and plan distribution networks<br>After Sales Parts Forecasting, Planning KAA |
| Basic Criteria: | No demand management strategy formulated; all customers and products planned and managed equally<br>Forecast based on prior history and sales force input; several forecasts developed by different groups (e.g. finance, sales, manufacturing) - no common forecast driving all functions<br>Sales planning driven by internal production capability<br>Scope of inventory visibility limited to central stocking locations; replenishment control and management not integrated throughout all network locations<br>No replenishment strategy developed - all parts replenished using same techniques<br>Inventory levels based on min/max inventory targets<br>No channel analysis conducted<br>Small number of distribution channels |
| Competitive Criteria: | Customer segment specific propositions and strategies<br>Statistical forecasting tools; multi-echelon forecasting; multiple views of same forecast available (e.g., number of vehicles for production, and money for sales) and single number forecasts used to drive different units - one function responsible for forecasting for all functions<br>Sales planning driven primarily by internal production capability, but also by some end customer requirements and dealer sales data Scope of inventory visibility encompasses all company-owned physical stocking locations in the network; replenishment control and management extended to all primary network locations<br>Customized replenishment methods developed to optimize costs and services<br>Planning linked with overall logistics planning processes, incorporating service level targets by product category<br>Regularly evaluation of potential sales and delivery channels<br>Variety of distribution channels |

TABLE 20-continued

After Sales - After Sales Parts
Forecasting, Planning

| | |
|---|---|
| Market Leading Criteria: | Extensive segmentation created; channel and customer specific strategies developed to manage parts planning Integration of real-time consumption data; collaborative forecasting. Sales forecasting include integrated process for customers, manufacturers and suppliers who share info and databases; complex algorithms used in a fully automated process, depending on characteristics of product demand<br>Sales planning driven by end customer requirements, dealer sales data and internal forecasts<br>Scope of inventory visibility includes all networks; replenishment control and management extended to internal and external locations, including suppliers and dealers channel inventories;<br>Strategic parts replenishment processes: replenishment re-optimization on demand changes<br>Inventory targets, policies and methods differentiated for "service" needs<br>Integrated, multi-channel strategy based on analytical insights, profitability and customer usage activity<br>Variety of distribution channels aligned to business needs, personalized and focused on providing point-of-need services |

TABLE 21

After Sales - After Sales Parts
Product Design and Management

| | |
|---|---|
| Description: | Develop physical solutions to specific customer needs, adopting new design principles and tools to better integrate serviceability and reliability criteria into the parts design process<br>Manage Product Data (Product Hierarchy/Catalogs/Documentation/Service Bulletins)<br>After Sales Parts Product Design and Management KAA |
| Basic Criteria: | Product definition focused on customer requirements<br>Design feedback accepted from manufacturing and purchasing through engineering change requests<br>No strategy or objective implemented for design for serviceability<br>No or little design collaboration exists, integration driven by informal and simplistic methods<br>No serviceability metrics developed or measured<br>Design tools not IT - enabled; limited 3-D CAD capabilities<br>Design activities occur with little collaboration; engineering personnel "publish" design to other functional areas<br>No supplier collaboration; communication performed through phone and emails<br>No Part System or single enterprise system for part(s)<br>No system or standalone software used by product planning to manage product option catalog |
| Competitive Criteria: | Formal business case development for prioritization of customer requirements; Quality Function Deployment (QFD) utilized to link requirements to specific design features<br>Design for supply chain constraints, manufacturability, serviceability<br>Goals and programs developed to enable design for serviceability<br>Multi-step, time-phase design, engineering and testing process used with specific "stage-gates" for serviceability criteria<br>Serviceability metrics (e.g., Avg. Repair time) used in technician/service performance reporting<br>Engineering design tools (e.g., CAD/CAE) used to share design factors and product data<br>Design representatives from functional areas play key approval roles in design process, with shared metrics and milestones |

TABLE 21-continued

After Sales - After Sales Parts
Product Design and Management

| | |
|---|---|
| | Information shared with suppliers to develop Collaborative Design |
| | Part Mgt tool with simple classifications |
| | Rule-based product catalog to manage option interrelation integrated with CRM. Same options used in product structure mgt application, but no integration |
| Market Leading Criteria: | Creation of robust product and market entry strategy; requirements analyzed across entire portfolio to ensure that market niches needs will be met; product designs consistent with service strategy |
| | Design optimized for total lifecycle cost; engineering changes controlled by PDM tool |
| | Design for serviceability is leading value proposition to customers and is used to enable field service force |
| | Cross-business platform design teams use collaborative work flows and tools to deliver integrated part design concepts |
| | Serviceability metrics are part of balanced scorecard and used for design improvements and new design concepts; continuous improvement programs developed as part of a holistic strategic framework |
| | Collaborative Product Commerce (CPC) application online as primary vaulting, revision and control of design data; design repositories for use across company; 3-D tools directly exchanging metadata (part attributes, BOM) with PDM; ability for digital pre-assembly of configurable products |
| | Cross-business platform design teams form when needed, share common metrics |
| | Suppliers treated as extension of the organization; product designs take into account specific supplier capabilities |
| | Part Mgt tool with full classification (e.g., fed directly with attributes from CAD); integration to supplier part catalogs |
| | Constraint-based product catalog to manage option interrelation. Integration with Research and development product structure mgt tools and CRM |
| | Product Documents created and updated in the system using the full range of PDM capabilities |

TABLE 22

After Sales - After Sales Parts
Marketing and Sales

| | |
|---|---|
| Description: | Manage business growth and customer loyalty, including marketing and sales strategy and product offerings development, distribution channels management, pricing development and setting |
| | After Sales Parts Marketing and Sales KAA |
| Basic Criteria: | Understanding of customers based on sales history and general macro-economic measures |
| | Customer needs translated into operational targets at the last stage of the supply chain |
| | Standard product range offered to customers; product development driven by Research and development and raw material improvement. |
| | Small number of distribution channels |
| | Brand and channel strategies largely separate; focus on existing accounts to meet current demand |
| | Historical volumes/pricing estimated; product costs calculated from average costs |
| | No strategic alliances with customers; the company cannot adapt quickly to changes in the customer market and has a low ability to exploit market information |
| | Customer opinion obtained from informal and irregular input; no access to external information |
| | Customer Requests/Feedbacks stored as documents |

TABLE 22-continued

After Sales - After Sales Parts
Marketing and Sales

| | |
|---|---|
| Competitive Criteria: | Understanding of customers based on sophisticated knowledge development in-house with little customer input |
| | Customer needs translated into operational targets for some units of the supply chain |
| | Standard product range offered with some tailoring to customer requirements; product development driven by customers |
| | Variety of distribution channels |
| | Brand and channel strategies developed in parallel; focus on maximizing sales via existing and new accounts |
| | Market research with customer panels; product costs calculated from Activity Based Costing history |
| | Some relationships developed with key clients; the company is focused on information exchange and overall performance optimization |
| | Customer opinion obtained from regular periodic input on manufacturers performance; external information obtained in report format and manually incorporated into plans and models |
| | Customer Requests/Feedbacks stored as knowledge linked to corresponding products, systems and parts |
| Market Leading Criteria: | Detailed understanding of customers and drivers of demand developed with customer input; segment-specific sales strategy |
| | Customer needs translated into integrated targets across the supply chain; customers share information with the company to allow better understanding of their needs |
| | Customer surveys used for segmentation; importance of customers based on their long term relationship; Industry trend and competitor analysis (Porter Five Forces, SWOT Analysis used) conducted; sources of competitive advantage identified, understanding what share of service each OEM has for his products |
| | Completely customized range offered; product development driven by currently unmet customer needs |
| | Variety of distribution channels including eCommerce and direct to customers; channel strategies based on customer segment, profitability and transaction history data collection |
| | Brand and channel strategy integrated with channel specific innovation; focus on stimulating demand via new channel development; OEM and channel partners utilize collaborative planning tools to ensure consistent information and quick response to market |
| | Market testing in different demographic areas; product costs calculated from Activity Based Costing models. Customer insight used to decide price |
| | Strong alliances with customers focused on managing interfaces with customers to generate a flexible and responsive system of long term collaboration |
| | Joint goal setting between manufacturers and customers continuously reviewed for performance improvement opportunities; detailed external information obtained in electronic format and used for modeling purposes |
| | Customer Requests/Feedbacks stored, linked and tied to knowledge and engineering changes. Rapid feedback from warranty systems; and service documentation available on-line |

TABLE 23

After Sales - After Sales Parts - Procurement and Inbound Logistics

| | |
|---|---|
| Description: | Manage Procurement |
| | Plan, schedule and manage inbound transportation and track receipts; manage and confirm inbound quality |
| | After Sales Parts - Procurement and Inbound Logistics KAA |
| Basic Criteria: | Sourcing process executed manually. Variations in the process exist across business units |
| | Information exchange with suppliers limited to the necessary operational level. Suppliers managed at a |

TABLE 23-continued

After Sales - After Sales Parts - Procurement and Inbound Logistics

| | |
|---|---|
| | distance. Manufacturers have little appreciation of suppliers goals and performance measures<br>Basic understanding of transportation requirements<br>Manual and paper-based delivery confirmation<br>Products delivered several days either side of the required date<br>Manufacture to stock policy with high stock levels for safety and stock-out avoidance; inventory levels monitored monthly<br>Inspection deferred until installation or usage; personnel return any suspicious product<br>Return tag indicates source and part information<br>Field personnel periodically return defective products<br>Storage and retrieval activities manually recorded<br>Parts stored regionally; product movements manually monitored<br>Stock status not updated electronically; physical verification done if necessary |
| Competitive Criteria: | Parts of the sourcing process supported by internal applications, but not linked together. Procurement personnel rely on their knowledge and personal experience to get the information they need Extensive data exchange with suppliers to improve logistics performance and reduce lead times. Joint goals set with suppliers but not monitored closely Initiating TQM, having ISO 9000 programs<br>Field uses standardized tools and manual processes to manage receipts; receipt matched against the PO Tight deadlines built into the product deliveries schedule<br>Manufacture to demand policy with stock limited to contingency levels; inventory levels monitored weekly<br>Critical items inspected prior to shipping with defined tolerances; non-critical items tested via random sampling; personnel aware of the need to return only product that meet certain criteria<br>Return tag indicates the type of defect (e.g., out-of-box, in-use, and specific failure)<br>Returns processed at last weekly; cost effective and timely routing determined<br>Automatic recording of product and location for storage and retrieval<br>Parts stored centrally and regionally; product movements remotely controlled<br>Stock status updated electronically but infrequently and with errors |
| Market Leading Criteria: | eSourcing application promotes consistent use of sourcing best practices across organization, improves collaboration and decision-making on sourcing activities, and increases the efficiency of the sourcing process<br>Extensive data exchange with suppliers; suppliers linked directly into OEMs supply chain and through this to the end customer. Advanced shipping notes, purchase orders, acceptances and delivery notices transferred via EDI. Joint key performance indicators set with suppliers to align to common goals<br>Fully developed TQM process implemented in transportation; carriers contribute to Quality Improvement Process<br>Automated receiving and tracking capabilities (e.g., bar coding)<br>Product delivered on JIT requirements to meet tight deadlines JIT policy; inventory managed in real time; quantities and locations known at all times<br>Critical items inspected through a formal QA process that include the supplier; personnel follow guidelines and procedures to do preliminary troubleshooting and diagnosis to minimize returns; personnel are given access to technical backup and assistance via phone/web<br>Information on the return tag is coded directly to a diagnostic to be performed upon receipt at the return processing center<br>Field schedules for defective parts shipment; cost of additional inventory considered to determine optimal returns schedule<br>Automatic recording of product and location for storage and retrieval integrated with production planning and scheduling systems<br>Parts stored centrally and regionally based on value and demand; product movements interfaced with the ERP system<br>Stock status updated in real time |

TABLE 24

After Sales - After Sales Parts
Warehouse Management

| | |
|---|---|
| Description: | Manage inventory and replenishment<br>Organize and manage picking, packing and shipping, kits processing and binning<br>After Sales Parts Warehouse Management KAA |
| Basic Criteria: | Inventory levels primarily driven by production; inventory mgt. not automated with suppliers<br>No lot sizing optimization done - all parts replenished using the same approach<br>Inaccurate store system stock; cost of inventory not accounted for<br>True inventory counts done very seldom and then primarily for financial reporting<br>System reporting very limited, some simple out-of-stock or non-sales reports used<br>Available to Promise visibility limited to finished goods inventory<br>Inventory updated manually<br>Inventory positions may not be updated according to all the relevant receipt and uplifting schedules<br>Warehouse Management<br>Replenishment based on forecast, sales and reorder points<br>Manual storing with paper documents; pick by order<br>Manual pallet loading; fixed routes; manual shipping document generation; 100% checking of shipment<br>Outbound plans to meet ship date; pick planning based on "first come, first served" basis |
| Competitive Criteria: | Inventory levels driven by a combination of production constraints, demand forecast and desired customer service levels; inventory mgt. automated with some suppliers<br>Various lot sizing approaches (e.g., EOQ and POQ) evaluated and implemented for specific parts classes<br>Higher level of accuracy of system stock; basic understanding of the cost of holding inventory (e.g., space, cost of capital, shrinkage)<br>Stock counts through hand held terminals and automatically update system<br>Fairly sophisticated reporting used to drive target stock counts each day<br>Available to Promise includes ability to view expected production receipts<br>Inventory and demand projections updated daily<br>Updates of inventory schedule may not be dynamic<br>Ability to use different replenishment techniques (e.g., EOQ, POQ, and MIN/MAX); ABC methodology developed<br>Dynamic pick slot assignment; multiple stocking locations<br>Dynamic routing random check of loaded orders<br>Outbound plans to meet delivery date and time; picking is planned to available labor, shipping schedule and load planning |
| Market Leading Criteria: | Multi-echelon planning ability to optimally determine inventory at all levels in the distribution network; integrated inventory planning systems; inventory plans jointly developed with suppliers<br>Product inventory managed in VMI style with an optimal balance between product carrying costs, optimal inventory positions, accurate delivery and scheduling<br>Inventory visibility across all geographies to be able to minimize safety stock |

TABLE 24-continued

After Sales - After Sales Parts
Warehouse Management

Dynamic lot sizing based on order profile and availability
System accuracy is high and matches physical stock;
Activity Based Costing allows understanding of total cost of holding inventory by major inventory classes; Sales data (EPOS) and inventory levels shared across the supply chain
Stock counting is system driven and on an exception basis only
Exception reporting for out of stocks and stock overages
Available to Promise includes ability to view expected production receipts. The system can reallocate resources to meet demand
Inventory and demand projections updated real-time from the ERP system
Inventory position for each product updated according to receipt and uplifting schedules, as well as production schedules
Replenishment driven by actual sales, model stocks and customer provided consumption data; JIT inventory management policies
Eliminated walking with AS/RS, paperless via RF; bar-coded container ID outlining pallet contents for mixed SKU pallets
One step shipping; load confirmation via RF; EDI transmission of shipment availability
Pick planning based on detailed planning and scheduling data, according to delivery criteria and load sequence

TABLE 25

After Sales - After Sales Parts
Outbound Logistics

| | |
|---|---|
| Description: | Processes and networks to manage items ordered by customers and/or distribution centers, adding value to them on the way to their final destination<br>After Sales Parts Outbound Logistics KAA |
| Basic Criteria: | Order taking process managed manually and supported internally by an on-line inventory database<br>Delivery and order accuracy information partly recorded but not shared with customers<br>Payment and receipts paper-based; payment history not available on-line<br>Transportation planning based on experience and uses manual routing of vehicles; transportation uses paper documentation either manually or computer generated for both transporter and customer<br>No receipt confirmation available for outbound shipments to dealers<br>Asset tracking of parts not enabled for the network<br>Manual, paper based return process; products returned through multiple channels with no central visibility<br>Fourth Party Logistics not understood<br>No forecasting process for returns<br>No formal procedures exist to identify, route and ship repair parts<br>Fast and cost driven rules in mode selection<br>Use existing contracts/price of carriers; phone carrier availability check<br>Limited info shared with customers |
| Competitive Criteria: | Order taking managed manually; suppliers have access to an on-line inventory database<br>Delivery and order accuracy information recorded and used by customer service personnel in response of customer requests<br>EDI and Electronic Funds Transfer (EFT) in most cases, but exceptions exist; payment history available on-line<br>Some mixed mode transportation; transportation uses on board technology to generate transport documentation for the customer for a specific load<br>Receipt confirmation for outbound shipment to dealer using both automatic and manual methods |

TABLE 25-continued

After Sales - After Sales Parts
Outbound Logistics

| | |
|---|---|
| | Asset tracking of parts enabled using a combination of manual and automated methods<br>Standard procedures for product returns; products tracked in an integrated system to understand reason/level and update replenishment systems<br>Fourth Party Logistics encountered and discussed between top management team<br>Returns and repairs estimated from historical trends<br>Technicians and service personnel use globally-consistent tools and manual processes to manage returns<br>Cost and quality driven rules in mode selection<br>Standardize on a few and have all carriers participate<br>Carrier availability checked via fax<br>Logistics info shared with customers; customers sometimes consulted for continuous improvement |
| Market Leading Criteria: | Order taking fully automated and integrated with customers; suppliers have visibility of demand and inventory position<br>Delivery and order accuracy data recorded and used proactively by customer service personnel; ordering possible via the Internet<br>All payments and receipts done via EDI and EFT; on-line payment history used to track compliance<br>Proactive management of mixed mode (e.g., ship, and road) with tradeoffs in inventory, freight costs and customer service fully understood. Land transportation uses automated routing systems based on automatic traffic information updates and customer specific requests; wireless communication used. Bill of Lading used<br>Automated data capture tools enable receipt confirmation and end-destination tracking of parts across all network locations<br>Product returns linked via EDI; product returned only in exceptional circumstances<br>Fourth Party Logistics operations implemented<br>System generated forecasting of returns and repaired products applying appropriate algorithms to more accurately predict returns<br>Planning system captures transaction data on returned products<br>Planning and execution system supports part identification, tracking and shipping destination<br>Dynamic, customer requirements and overall costs driven rules in mode selection<br>Develop carriers contracts designed to standardize and simplify rates and services; volume shipped by mode and carrier monitoring to meet contractual obligations<br>On-line status of carrier availability; parts can be drop shipped to minimize centrally held inventory<br>Detailed understanding of customer requirements; Customers have an online visibility of logistics data; customers consulted for continuous improvement |

TABLE 26

After Sales - After Sales Services
Service Strategy

| | |
|---|---|
| Description: | Create, develop, tailor and monitor an overall set of service offerings based on customer, competitor, channel and industry analysis<br>After Sales Services Service Strategy KAA |
| Basic Criteria: | No predictive service forecasting capabilities implemented<br>Some market research done (competitor analysis or customer segmentation) as a basis for design of new service offerings<br>Service feedback rarely taken into consideration when developing new products<br>Undifferentiated services provided to customers; customers are given the same full level of service independent of their importance and willingness to pay for this service<br>No formal process for the introduction of new service offerings |

TABLE 26-continued

After Sales - After Sales Services
Service Strategy

| | |
|---|---|
| | Performance measures do not span the supply chain due to limited aligned of unit goals. Service measures for internal customers not tracked |
| | Customer complaints logging for information. Often separate from marketing |
| | Field service is scheduled on FIFO rules |
| | Some understanding of the cost to serve customers; costs allocated to products rather than customers |
| | Lack of communication strategy |
| | Tactical promotions to boost short term sales and margins |
| Competitive Criteria: | Data capture from service events used into service forecasting model for budgeting deployment and target setting |
| | Competitor offerings sometimes used as the basis for the development of new service offerings |
| | Some market differentiation with specific services delivered to defined target customer segments; customers receive a level of service selected from a limited number of options and customers willingness to pay |
| | High-level process for new service introduction |
| | Performance measures span the internal supply chain, mainly from a high level strategic perspective; limited basic metrics for internal customers |
| | Serviceability is a consideration in product design |
| | Field service is scheduled on call location |
| | Understanding of the cost to serve customers, based on a contribution level analysis (sales revenue less direct cost of products sold) for each customer/segment |
| | Communication seen as fundamental to gain competitive advantage |
| | Promotions to enhance market penetration rather than volume |
| Market Leading Criteria: | Real-time service event data capture enables on-line analysis using data-mart and simulation tools; customer satisfaction surveys used to measure performance and drive improvement initiatives |
| | Service data and customer feedback used to create a flow of information about service needs; extensive research (both competitor offering analysis and customer segmentation analysis) as a basis for new service offerings design and developing |
| | Services used as the key differentiator against competitors; competitor offerings continually monitored and incorporated into the development of new offerings |
| | Highly differentiated market with services targeting a range of defined customer segments |
| | Customer service staff acts as customer retention team; service is given to the level required by each customer and the cost/profitability - service trade-off is fully understood by both customer and the company |
| | Formalized, structured process for new service introduction; customers involved in the design process |
| | Performance measures span the internal and external supply chain and are linked to customer needs satisfaction; service performance monitored and optimized continuously |
| | Product designs consistent with service strategy; service organization represented in the design process |
| | Field service is scheduled based on heuristics including labor rate, time, service revenue and margin. |
| | Full understanding and control of the cost to serve all customers based on Activity Based Costing methodologies for all direct and indirect costs |
| | Communication investment focused on delivering value to aid decision making |
| | Total service culture with immediate on-line response, ownership of the problem, empathy with customers and "get back as promised" features |
| | Targeted promotions based on competitive performance of products |

TABLE 27

After Sales - After Sales Services
Technical Support

| | |
|---|---|
| Description: | Manage Technical organization and technical activities |
| | Develop and maintain services |
| | After Sales Services Technical Support KAA |
| Basic Criteria: | Limited diagnostic tools and processes offered |
| | Technical support operates regionally |
| | Data accuracy procedures not in use (e.g., root cause analysis); multiple sources exist for the same data element |
| | Internally-centric architecture; security cannot be extended beyond the enterprise |
| | Manual procedures defined to restore service failed |
| | Users call application support directly with application questions or problems |
| | Databases for service history and failures maintained, but not routinely analyzed for trends and impending failures |
| | Training is reactive; on the job learning |
| | Customer opinion obtained from informal and irregular input |
| | Effort placed on recovery from failure with little effort on prevention |
| Competitive Criteria: | Deliver a set of interactive diagnostic tools to enable self diagnosis of common problems (intelligent guides, providing detailed problem resolution process (defined set of steps, tools and templates based on support technician experience) |
| | Technical support operates regionally and shares information among locations |
| | Synchronized data entities across systems (naming standards, formatting, internal data usage) |
| | Technical architecture based on Point-to-Point connectivity |
| | Processes/scripts defined for operations or support staff to recover failed services |
| | Users or application help desk log problems to a problem ticket capability; support staff monitor and address problems reported |
| | Fix databases built to help less experienced technicians to resolve high percentage of issues |
| | Training plans from individual needs; flexible and distance learning methods |
| | Customer opinion obtained from regular periodic input on manufacturers performance |
| | Root cause analysis of problem conducted |
| Market Leading Criteria: | Enable visibility of service cases (service information integrated and stored in the event record for customer; service history used to build knowledge support and feedback to OEMs); provide easy direct access (links) to patches, downloads and other recommended resolution to customer problems |
| | Technical support operates centrally to ensure trouble-shooting and product data is aggregated and dispatches service regionally to improve service performance |
| | Internet used as primary communication tool |
| | Global architecture and connectivity; all customers/suppliers have access to relevant data real-time |
| | Tools, processes and redundancy planned and implemented to automatically recovery from service failures; performance metrics constantly monitored |
| | Users log problem tickets and support is immediately notified of critical issues |
| | Tailored training driven by business plans |
| | Provide technicians with experts support needed, when they need it, by facilitating collaboration and aligning support within regions and across the globe |
| | Customers continuously reviewed for performance improvement opportunities |
| | Continuous improvement programs used with root cause analysis performed on problems to design preventative solutions |

TABLE 28

After Sales - After Sales Services
Warranty and Recall Campaign Management

| | |
|---|---|
| Description: | Definition and management of warranty coverage and procedure management |
| | Management of warranty claims lifecycle, including claim entry, validation, analysis |
| | Management of dealer warranty support and execution of warranty audits, supplier collaboration and product improvements; management of recall campaigns |

After Sales Services Warranty and Recall Campaign Management KAA

| | |
|---|---|
| Basic Criteria: | Limited or no collaboration on warranty design between product team and service team |
| | Basic controls on cost of warranty with deep divisions between Service and Manufacturing; reasonable tracking of actual costs and claims against budget |
| | Information still paper-based; some communication sent electronically |
| | Warranty and repair data maintained, providing aggregate reports to manufacturing and engineering |
| | Manufacturing targeted at minimizing unit production cost with no view on Total Cost of Ownership |
| | No formal procedures exist for identifying and managing return parts |
| | Partial visibility of repair loop - from receipt of defect back through repair |
| | Data shared with suppliers/dealers through phone and emails |
| Competitive Criteria: | Service provides input into design to maximize product reliability |
| | Service and Manufacturing starting to work together to align warranty with actual market requirements; tight monthly reporting with regular forward and backward reviews of performance |
| | Time and expense captured for all claims |
| | Stand-alone warranty and repair database, data linked back to specific shifts and product lots to support corrective action |
| | Good understanding of balance between warranty costs and benefits; early efforts to minimize Total Cost of Ownership |
| | Consistent tools and processes to manage returns |
| | Full repair loop visibility |
| | Data shared with suppliers/dealers using point-to-point integration; no direct download of applications and documentation |
| Market Leading Criteria: | Products developed jointly by Manufacturing and Service to maximize reliability Integrated profitability analysis tools to create, price and sell extended service contracts; win/win efforts to share savings |
| | On-line/real time product and purchasing info registration and management, customer profile and warranty info/history; availability of early warning/real time alerts systems and root cause analysis processes |
| | Customer configuration details stored to enable customer specific diagnostic support; warranty and repair data treated as fundamental product data and stored with other product content |
| | One, integrated solution to manage claims processing and settlement with clear work queues/workflow management; rule-based monitoring of incoming claims combined with out of polices reporting an field audits |
| | Integrated warranty data/claims with the engineering/manufacturing/quality management system |
| | Streamlined parts-returns process by using digital images and exception based returns; full tracking of repairs with identification of repeat failures; documented process for improvement |
| | Provide clear policies, customer education and conduct audits in order to ensure customer audits to entitlement rules |
| | Collaborative OEM-Suppliers quality improvement processes and systems with automated payment reconciliation; negotiate terms and conditions that identify warranty costs and specific responsibilities; data shared with suppliers using portal, configurable accesses to multiple partners |

TABLE 28-continued

After Sales - After Sales Services
Warranty and Recall Campaign Management

Develop warranty claim processes that make suppliers fully accountable; assist dealers through web-based portals/call center for warranty submission and technical information

TABLE 29

Cross Core Functions - Cross Functional Planning

| | |
|---|---|
| Description: | Manage Service Policy |
| | Analyze Sales Plan and Balance Supply/Demand |

Cross Functional Planning KAA

| | |
|---|---|
| Basic Criteria: | There are no shared services. Support functions replicated for each business unit |
| | Supply/demand plan prepared on a rolling basis which may be inconsistent with the planning inputs (e.g., supply forecast, demand forecast and inventory position) as well as planning horizons used for production plans and material movements |
| | The planning process is fragmented due to different functional units making their own decisions |
| | Low visibility of the supply/demand plan. Access by contact with people who produce the plans |
| | Business operations divided along regional or functional lines; no conflict resolution mechanism defined |
| | Production planning driven by production capability; planners use experience to plan manually |
| | Demand variability measured monthly for a product across a geographic region; no detailed analysis of demand variability |
| | Safety stock levels usually monitored every 12 months; inventory levels based on min/max inventory targets |
| | There is a supply chain for each business unit; supply chain units within the company plan and forecast independently |
| Competitive Criteria: | Some support and line services operate as shared services |
| | The planning process brings together sales, marketing and supply operations in an unofficial and ad-hoc manner |
| | Limited on-line visibility of the supply/demand plan |
| | Formal mechanism for resolving regional or functional conflicts, adhered to by all groups in the entire company |
| | Production planning is primarily forecast driven with some visibility to open orders |
| | Demand variability measured monthly by customer segment, by product across a sales region; forecast error changes monitored and analyzed at product and geography levels |
| | Planning linked with overall logistics planning processes, incorporating service level targets by product category |
| | The supply chain spans the company, across all business units. Demand planning systems automated internally but not linked externally to customers or suppliers |
| Market Leading Criteria: | There is an optimal mix of shared service and line responsibility for line and support processes |
| | Supply/demand plan prepared on a rolling basis which is consistent with the planning inputs (supply forecast, demand forecast and inventory position) as well as planning horizons used for production plans and material movements |
| | The planning process brings together sales, marketing and supply operations to ensure planning integration across the supply chain functions |
| | Supply/demand plan with system-wide visibility to provide information to supply chain decision-makers throughout the network |
| | Formal mechanisms for conflict resolution based on effective team work between global command centre and process planners |
| | Production planning primarily driven by demand based scheduling and is optimized for plant capacity and material availability |
| | Demand variability measured weekly by customer segment, by supply location, by product; forecast error tracked and root cause analysis conducted |

TABLE 29-continued

Cross Core Functions - Cross Functional Planning

Short term variability managed through application Safety stocks levels altered on-line in direct response of demand and supply variability through the supply lead time
Demand planning systems fully integrated throughout the supply chain both inside and outside the company

TABLE 30

Cross Core Functions - Order Management

| | |
|---|---|
| Description: | Manage Vehicle Order Configuration and Delivery to the Customer<br>Fulfill Order from Production/Stock<br>Order Management KAA |
| Basic Criteria: | Production overstretches to respond to every order. Planners use experience to plan manually. In time of shortage, customers orders are allocated on a "first come, first served" basis<br>Orders are not automatically generated and require manual order entry and monitoring<br>Order received by phone/fax; customer requirements captured into a paper-based design; no Internet ordering<br>Orders/stock allocation on a first come first served basis<br>Backorders tracked manually<br>Standard delivery documentation generated by every order; information on product inventory not available on-line<br>Delivery documentation produced at dispatch point day after order received<br>Time between delivery and invoice >5 days<br>Choice of transportation mode driven by transport cost<br>Orders picked to maximize truck utilization and minimize handling |
| Competitive Criteria: | Production Planning allows for some flexibility for unforecasted orders. All production planning systems are automated but not linked throughout the supply chain. In time of shortage, customer orders are allocated on the size of orders<br>Orders are manually entered into system but detailed management reporting of reorders is available<br>Orders received via EDI; order capture direct into mainframe/personal computers via phone/fax (manual)<br>Orders/stock allocation prioritized per customer importance/size<br>Backorders prioritized based on pre-set criteria and tracked manually<br>Delivery documentation manually generated to meet specific customer requirements and produced at dispatch point the same day as order received<br>Time between delivery and invoice <5 days<br>Choice of transportation mode driven by total supply chain cost<br>Orders picked to maximize customer goods receiving needs |
| Market Leading Criteria: | Production or delivery prioritized according to customer segmentation priority measures and order profitability. Production planning systems are fully integrated throughout the supply chain. At time of shortage product allocated to customers on the basis of customer segmentation rules<br>Integrated web based system for order entry; ability to integrate order information with warehouse data; electronic invoices presented to customers online, via email, etc<br>Capture order: a combination of web, chat, telephony and messaging to customers, sales force and channel partners to communicate with sales force in order to confirm order details, to capture payment information and to validate order quantity<br>Orders/stock allocation conducted on a plan replenishment basis after consultation with customer<br>Track order: real-time order status, order history and order problem notification using a customer's preferred channel (web page, email, mobile phone) to provide alternative solutions and to confirm order changes<br>Shortfall in supply proactively managed to meet customer needs; variations in production volume can be accommodated |

TABLE 30-continued

Cross Core Functions - Order Management

Automatic generation of all delivery documentation through reference to customer - product - destination, using online tracking delivery, proactive notification of shipping delays, integration with logistics providers, integration with back-end systems and confirmation of delivery to increase customer satisfaction
Time between delivery and invoice same day
Choice of transportation mode driven by supply chain cost and service consideration
Orders picked to customer's requirements

TABLE 31

Cross Core Functions - Quality Management

| | |
|---|---|
| Description: | Define Quality Specifications and Manage Quality Testing (internal and external)<br>Manage Quality Improvement Plans<br>Quality Management KAA |
| Basic Criteria: | Significant facility space and manpower required to conduct quality checks<br>Statistical Quality Control off-line<br>Inspection deferred until installation or usage; personnel return any suspicious product<br>Partial visibility of repair loop - from receipt of defect back through repair; data shared with suppliers/dealers through phone and emails<br>Databases for service history maintained but not routinely analyzed for service trends<br>Customer opinion obtained from informal and irregular input; no access to external information<br>Customer Requests/Feedbacks stored as documents<br>Manual order entry and monitoring; customer requirements captured into a paper-based design |
| Competitive Criteria: | Automated quality checking processes used.<br>There are separate in-process and final inspections<br>On-line process and product quality control and certification and costs of quality measures used Critical items inspected prior to shipping with defined tolerances; non-critical items tested via random sampling; personnel aware of the need to return only product that meet certain criteria<br>Full repair loop visibility; data shared with suppliers/dealers using point-to-point integration; no direct download of applications and documentation<br>Service and failure database utilized to produce performance reports<br>Customer opinion obtained from regular periodic input on manufacturers performance; external information obtained in report format and manually incorporated into plans and models<br>Customer Requests/Feedbacks stored as knowledge linked to corresponding products, systems and parts<br>Order capture direct into mainframe/personal computers via phone (manual) |
| Market Leading Criteria: | Simple mistake-proofing devices used to prevent off specification product so product is blended right, first time, every time<br>Quality is everyone's responsibility<br>Critical items inspected through a formal QA process that include the supplier; personnel follow guidelines and procedures to do preliminary troubleshooting and diagnosis to minimize returns; personnel are given access to technical backup and assistance via phone/web<br>Collaborative OEM-Suppliers quality improvement processes and systems with automated payment reconciliation; negotiate terms and conditions that identify warranty costs and specific responsibilities; data shared with suppliers using portal, configurable accesses to multiple partners<br>Failure trends identified through service history. Predict failure by statistical analysis of historical service and failure information in order to manage continuous improvement<br>Joint goal setting between manufacturers and customers continuously reviewed for performance improvement |

TABLE 31-continued

Cross Core Functions - Quality Management opportunities; detailed external information obtained in electronic format and used for modeling purposes
Customer Requests/Feedbacks stored, linked and tied to knowledge changes; rapid feedback from warranty systems; service documentation available on-line
Order capture: a combination of web, chat, telephony and messaging to customers

TABLE 32

Cross Core Functions - Call Center Management

| | |
|---|---|
| Description: | Support service management<br>Manage call center requirements and capacity/staffing and scheduling<br>Manage knowledge base<br>Call Center Management KAA |
| Basic Criteria: | Irregular consumer research; basic understanding of explicit customer requirements; customer service standards rarely documented; specific requirements recorded for specific customers; limited understanding of the tradeoff between customer service and costs; firm provides additional service without knowing the total cost; limited measurement and feedback on customer service levels<br>Standard 8 hour staffing<br>On the job training<br>Limited degree of joint planning with customer base<br>Call center operates autonomously from technical support |
| Competitive Criteria: | Periodic customer service surveys intended to measure specific values; information used once to make point decisions; irregular customer visits by senior management to uncover hidden values; basic understanding of cost/service tradeoffs; limited capture of additional service costs; firms recognize customer values and understand their relative performance in meeting expectations<br>Proactive staffing/Back-up<br>Formal Training<br>Some degree of planning and resource sharing, typically initiated by customer; customer inputs may drive the planning operation where feasible (push system)<br>Call center shares information and is integrated with technical support |
| Market Leading Criteria: | Formal service level setting process - satisfying customers based upon long-term, strategic considerations as well as short-term profitability; regular assessment of customer values through open communications and observations; customer needs are recorded, tracked and updated<br>Firms follow a formal customer service planning methodology including: internal/external customer audits; potential solutions; and established service levels; firms share resources (e.g., on-site) in order to gain a full understanding of the other's values; firms conduct supplier assessments to gain consistency throughout the supply chain<br>Cross-functional team staffing skilled and trained to make proactive decisions<br>Integrated Performance Support; 24 hours *7 days support, automated 24-hour access for standard routine requests<br>High percentage of first call resolution to promote one stop service<br>Utilization of caller identification; customer inputs used in planning<br>Call center, technical support, engineering, manufacturing, purchasing and marketing are tightly integrated; personalized service based on customer history |

TABLE 33

Cross Core Functions - Remanufacturing and Recycle Management

| | |
|---|---|
| Description: | Manage good/vehicle returns<br>Manage remanufacturing/recycling/disposal<br>Remanufacturing and Recycle Management KAA |
| Basic Criteria: | Inspection deferred until installation or usage; personnel return any suspicious product<br>Return tag indicates source and part information<br>Field personnel periodically return defective products<br>Manual, paper based return process; products returned through multiple channels with no central visibility<br>No forecasting process for returns<br>No formal procedures exist to identify, route and ship repair parts; partial visibility of repair loop - from receipt of defect back through repair<br>Formal tools and procedures not applied to remanufacturing/recycle/disposal operations<br>Remanufacturing strategy driven primarily by the need for a low cost base or high efficiency. Manufacturing/remanufacturing in-house activities |
| Competitive Criteria: | Critical items inspected prior to shipping with defined tolerances; non-critical items tested via random sampling; personnel aware of the need to return only product that meet certain criteria<br>Return tag indicates the type of defect (out-of-box, in-use, and specific failure)<br>Returns processed at last weekly; cost effective and timely routing determined<br>Standard procedures for product returns; products tracked in an integrated system to understand reason/level and update replenishment systems<br>Returns and repairs estimated from historical trends<br>Technicians and service personnel use globally-consistent tools and manual processes to manage returns; full repair loop visibility<br>Remanufacturing/recycle/disposal managed with a set of formal procedures and metrics<br>Remanufacturing strategy driven primarily by customer requirements. In-house operations are dominant, but there is some ad-hoc outsourcing |
| Market Leading Criteria: | Critical items inspected through a formal QA process that include the supplier; personnel follow guidelines and procedures to do preliminary troubleshooting and diagnosis to minimize returns; personnel are given access to technical backup and assistance via phone/web<br>Information on the return tag is coded directly to a diagnostic to be performed upon receipt at the return processing center<br>Field schedules for defective parts shipment; cost of additional inventory considered to determine optimal returns schedule<br>Streamlined parts-returns process by using digital images and exception based returns; full tracking of repairs with identification of repeat failures; documented process for improvement<br>Planning system captures transaction data on returned products and supports part identification, tracking and shipping destination<br>Remanufacturing/recycle/disposal managed with formal procedures; repair operations considered for outsourcing where financially and strategically justified<br>Remanufacturing are time, efficiency and customer needs driven and service trade-offs are fully understood. Manufacturing/remanufacturing are flexible, with in-house and outsourcing, alliances and continuous monitoring of the market place to select best options; options can be changed quickly<br>Design for Environment (DfE) used: product design for disassembly, reuse and recycle; promote and support alternative uses for the product (e.g., direct re-use, remanufacture, and sell it to 2nd generation market) |

The following Tables 34-41 provide an explanation of the capabilities, key assessment areas and performance capability criteria within the support functions platform 104. For example, as shown in Table 34, the financial management capability 194 is a financial management key assessment area that includes financial management basic PCC, financial management competitive PCC, and financial management market leading PCC.

TABLE 34

Enterprise Management - Financial Management

| | |
|---|---|
| Description: | Manage funds of the organization both short and long term<br>Manage and monitor enterprise performance and enterprise risk |

Financial Management KAA

| | |
|---|---|
| Basic Criteria: | Annual budgeting not based on clear longer term plans/targets<br>Budget fixed annually and is a bottom-up activity<br>Local administration<br>Limited management reporting<br>Finance function provides financial numbers/support to managers<br>Sales and Cost data with little interpretation<br>Finance is the only function who understand the numbers<br>Repeated/duplicated processes; lack of standardization; high proportion of effort spent on transaction processing and low value-added activities<br>Little standard "what-if" analysis and support<br>Manual cash book; mainly manual payment<br>Little communication between Finance and rest of the organization; Finance operates as stand-alone function; minimal links between each functions<br>Finance retains control of access to on-line information |
| Competitive Criteria: | Annual budgeting takes financial targets from longer term strategic plan<br>Budgeting focused on financial return/value; top-down and bottom-up approach used<br>Shared administration<br>Regular updates on activity from commercial departments<br>Finance works within teams to provide financial information and decision support<br>Variance and exception analysis<br>"Numbers" generally understood by wider business management; KPIs/balanced scorecard performance measurement<br>Accounting, standardized reporting and transactional activities centralized into shared services centers<br>Ad hoc spreadsheet used regularly for modeling and evaluation<br>Computerized cash book<br>Organizational model restructured to be "customer" focused<br>Involve Finance in entire business process; using economies of scale in processing functions |
| Market Leading Criteria: | Long term strategic plans and targets set for annual budgeting<br>Budgeting focused on achieving strategic goals; Activity Cost based budgeting<br>Outsourced administration; asset portfolio information on line to relevant parties<br>On-line access available to commercial departments<br>Finance works within teams to integrate all information for managers; activity and value/cost analysis<br>High proportion of Finance effort spent on value-added activities; finance develop specialist activities (e.g., Tax and KPIs) and understands the needs of the rest of the organization<br>Flexible and integrated planning and what-if tools linked to operational data<br>Cash book part or fully integrated system<br>Finance responds to needs of "customers", producing required information<br>Create cross-functional responsibilities and processes; integrate business support skills of Finance into the rest of the organization<br>Define and communicate a Credit Risk Strategy, providing written procedures and credit policies; capture country risk; use Internal Risk Rating Systems |

TABLE 35

Enterprise Management - Human Resources

| | |
|---|---|
| Description: | Attract, develop and retain talented workers<br>Develop, disseminate and manage the company knowledge |

Human Resources KAA

| | |
|---|---|
| Basic Criteria: | No flexibility in job roles: resources dedicated to roles; changes in roles are subject to workplace agreements and/or negotiation<br>Employees do not feel that they own new initiatives<br>Training and development plans are high level and do not specify who requires what training, by when. All new training conducted after the initiative has been completed<br>Training provided when employees change positions within the company; training reactive<br>There are limited teams in place; the company relies on traditional work structures<br>Performance measures focused on individual performance and not related to business objectives<br>Remuneration based on years of experience and job description<br>Roles and responsibilities negotiated between supervisor and employee<br>Recognition for highly innovative employee |
| Competitive Criteria: | Flexibility in job roles to support carrier development; multi-skilled resources<br>Employees consulted to develop plans, to define responsibilities and change initiatives<br>A detailed training and development plan established at the beginning of a new initiative; employees trained "Just In Time" prior to new initiatives<br>The company provides selected role related training to support a shift from functional to process orientation; training plans from individual needs<br>Teams work in most areas, although some fragmentation between teams exists<br>Some team performance measures introduced and focused on business unit objectives<br>Skills and team work have some impact but remuneration is primarily job grade scale<br>Roles and responsibilities documented for each position in the organization<br>Recognition and monetary awards for highly innovative employees |
| Market Leading Criteria: | Highly flexible workforce with limited barriers to short term change<br>Employees understand the change goals and have an extensive input into the Action Plan development, knowing their responsibilities<br>Employees involved in defining the new skill set and test running the training delivery modes. Experts identified to build internal skills. Experts conduct all the internal training of their peers prior to the new initiative being implemented; all employees are able to perform their new roles at higher levels with confidence<br>The company has an extensive training and development program; it provides an on-going education related to KPIs and performance evaluation; training driven by business plans<br>Integrated performance management system with an optimal mix of individual and team measures directly tied to business objectives<br>Teams operate cross-functionally and include part time involvement in support teams<br>Productivity goals established and reviewed/increased annually; compensation/incentive bonus programs based on goals reached<br>Remuneration significantly impacted by knowledge and contribution to team performance<br>Roles and responsibilities documented in detail and linked to the performance evaluation and compensation process<br>Employee reward and retention programs in place to retain top performing agents<br>Staffing and hiring decisions on forecasting analysis; use critical behavior interview during hiring process<br>Provide consistent methodologies, processes and team structures with the appropriate alignment across locations<br>Formal innovation programs which encourage employees to pursue ideas |

TABLE 36

Enterprise Management - Information Management

| | |
|---|---|
| Description: | Manage information resources, creating, capturing, storing, classifying, retrieving, evaluating, protecting and distributing data within the organization; developing strategies to manage data; including provision of services to internal and external customers, based on information resources<br>Information Management KAA |
| Basic Criteria: | Ad hoc, reactive, technology updates, minimal assessment of impact, no communication of benefits<br>No or minimal performance monitoring, only reactions to problems<br>Multiple systems with little integration or flexibility and little reliability<br>Ad hoc updates to core software packages, with minimum user involvement<br>Information systems utilized for decision support<br>Business systems are only transaction focused. There are no system for planning and analysis tools<br>Information captured and managed using databases that are manually updated<br>Information exchange with suppliers limited to the necessary operational level<br>Information shared only within the supply chain segment which owns the data<br>Information systems used for decision support; transaction systems are stand-alone and there are no common data<br>Significant delays in obtaining information due to lack of control between systems and multiple data entry requirements<br>Information archived; data resides in many different formats |
| Competitive Criteria: | Regular, planned, technology updates; benefits identified<br>Performance monitored using basic tools; performance tuning is manual and reactive<br>Systems linked by automatic interfaces but no flexible to changing business needs<br>Updates planned and users advised<br>Information systems used for simple decision making (e.g., stock reordering)<br>Limited analysis toolset periodically updated with transaction information<br>Integrated databases regularly used for information management but are mainly manually updated<br>Extensive data exchange with suppliers to improve mutual logistics performance and reduce lead times<br>Information shared across the whole of the internal supply chain<br>Information systems used for simple decision making (e.g., stock reordering); all major transaction systems are integrated, specialist systems are not fully integrated (e.g., marketing or forecasting)<br>Cross-system information available for regularly required activities; reports prepared in an ad hoc manner requiring queries to be run on several databases<br>Information archived in a repository available to the entire organization; data resides in a common format |
| Market Leading Criteria: | Alternative technologies evaluated, benefits of change/upgrade identified and communicated<br>Appropriate tools in place to automate performance tuning; performance monitoring against KPIs and anticipation of problems<br>Integrated systems, flexible in responding to change business needs<br>Updates planned and installed with full user involvement<br>Expert systems used to consider demand, transportation resources/costs, available storage, product acquisition costs, physical constraints and replenishment plans<br>There is an extensive integrated modeling and analysis toolset (e.g., decision support system)<br>Databases fully integrated and automatically updated in real time; systems support supply chain planning of demand, transportation, production and material requirements<br>Extensive data exchange with suppliers and customers to innovate products and processes. Suppliers linked directly into the manufacturers supply chain and through these to end-users. EDI linkages used; shipping notes, purchase orders, delivery notices transferred via EDI<br>Information shared through real time data integration between supplier and customer EDI systems; POS data tracking allows continuous replenishment<br>Expert systems used to make complex and autonomous decisions; there is one enterprise-wide system solution which fully integrates all component systems and extensive use of data capture, processing and analysis systems to process information in all functional areas<br>Data kept in a central repository available to the entire organization and resides in a client/server platform open to the appropriate users |

TABLE 38

Enterprise Management - Procurement (indirect)

| | |
|---|---|
| Description: | Manage strategic sourcing, establishing supplier contracts and managing orders<br>Manage supplier relationship/partnership and monitor supplier performance<br>Procurement (indirect) KAA |
| Basic Criteria: | Sourcing process executed manually. Variations in the process exist across business units<br>Supplier selection criteria based on price and quality<br>No central, single location for contracts storage. Contracts are stored in hard copy<br>Orders are not automatically generated and require manual order entry and monitoring<br>No segmentation of existing supply base<br>Buyer keeps track of some suppliers' performance; No consolidated performance metrics<br>Supplier Performance is monitored based on selected terms of the agreement (e.g., price)<br>Information exchange with suppliers limited to the necessary operational level. Suppliers managed at a distance.<br>Manufacturers have little appreciation of suppliers goals and performance measures |
| Competitive Criteria: | Parts of the sourcing process are supported by internal applications, but are not linked together. Procurement personnel rely on their knowledge and personal experience to get the information they need<br>Reduced number of suppliers selected by strategic Key Performance Indicators (KPIs)<br>Contracts are stored centrally and electronically imaged but no capability to report against key fields on contracts such as expiration dates<br>Orders are manually entered into system but detailed management reporting of reorders is available Importance of key suppliers is recognized and reflected appropriately<br>Supplier Performance tracking strategy is in place<br>KPIs are linked to business unit objectives with focus on select areas such as delivery quality, material/service order completion, order fulfillment, and timeliness<br>Extensive data exchange with suppliers to improve logistics performance and reduce lead times. Joint goals set with suppliers but not monitored closely |
| Market Leading Criteria: | eSourcing application promotes consistent use of sourcing best practices across organization, improves collaboration and decision-making on sourcing activities, and increases the efficiency of the sourcing process<br>Reduced number of suppliers selected by strategic Key Performance Indicators (KPIs) with emphasis placed on supplier's ability to develop long-term strategic relationship<br>Single contracts database and system to provide visibility and aid management of contracts.<br>Electronic repository includes pricing, terms and conditions, insurance certificates and allows for maintenance and reporting against contract expiration dates<br>Orders are automatically generated by system replenishment rules<br>Suppliers are grouped into three different segments: key, potential, and transactional. Goals, work and management processes are defined accordingly<br>Automated tracking of Supplier Performance and Compliance and communicated to supplier (e.g., up to supplier real time access to KPIs); Continuous improvement programs |

TABLE 38-continued

Enterprise Management - Procurement (indirect)

developed with selected suppliers
Suppliers are measured on all KPIs required to ensure the objectives are met including delivery accuracy, quality monitoring, and compliance with other contract terms, innovation, flexibility, and problem responsiveness.
Extensive data exchange with suppliers; suppliers linked directly into OEMs supply chain and through this to the end customer. Advanced shipping notes, purchase orders, acceptances and delivery notices transferred via EDI. Joint key performance indicators set with suppliers to align to common goals

TABLE 39

Enterprise Management - Legal Compliance

| | |
|---|---|
| Description: | Manage legality according to laws of the partner country, including legal rights, payment of taxes, mergers and acquisitions.<br>Verification of compliance with regulations<br>Legal Compliance KAA |
| Basic Criteria: | Legal approach to compliant resolution and complaints usually disputed<br>No central, single location for contracts storage.<br>Contracts stored in hard copy<br>Manufacturing targeted at minimizing unit production cost with no view on Total Cost of Ownership<br>Do not update policies and procedures<br>Do not monitor compliance to policies and procedures<br>Lack of performance management agreements<br>Focus on internal measures |
| Competitive Criteria: | Complaints management system with reparations made for valid complaints<br>Contracts stored centrally and electronically imaged but no capability to report against key fields on contracts such as expiration dates<br>Good understanding of balance between warranty costs and benefits; early efforts to minimize Total Cost of Ownership<br>Maintain paper-based procedures and distribute changes<br>Carry out regular audit policies and procedures<br>Management teams responsive to process performance reporting<br>Some comparison of internal/external (e.g., competitor best practices) |
| Market Leading Criteria: | Complaints seen as valued customer information and mutually resolved<br>Single contracts database and system to provide visibility and aid management of contracts.<br>Electronic repository includes pricing, terms and conditions, insurance certificates and allows for maintenance and reporting against contract expiration dates<br>One, integrated solution to manage claims processing and settlement with clear work queues/workflow management; rule-based monitoring of incoming claims combined with out of polices reporting an field audits<br>Develop warranty claim processes that make suppliers fully accountable<br>Document procedures available to employees online<br>Systemized checks and controls ensure adherence to policies and procedures<br>Every work team continually seeks process performance improvements<br>External audit of procedures |

TABLE 40

Enterprise Management - Enterprise Asset Management

| | |
|---|---|
| Description: | Manage Facilities, Maintenance and Safety and Security Manage general administrative<br>Enterprise Asset Management KAA |
| Basic Criteria: | Utilities consumed locally as required; product costs calculated using averaged costs<br>The maintenance philosophy is "fix it when it breaks"<br>Facilitates locations based on historical events<br>Fixed asset items bought on an as-needed basis to replace obsolete or worn-out equipment<br>Fixed asset ledger is simply a tool for inventory control and asset depreciation<br>Asset loss not known/reported for tax purposes until the end of an accounting period or even the end of an asset's scheduled depreciable life<br>Fully depreciated assets cast off into a storage location full of obsolete hardware of different types waiting for someone to decide to throw it in the garbage<br>Surplus asset of one business unit not marketed to other business units<br>Documentation managed in informal libraries, not often kept current with changes. Databases for service history maintained but not routinely analyzed for trends<br>Little predictive maintenance technology installed |
| Competitive Criteria: | Utilities purchased nationally in bulk; product costs calculated from historical Activity Based Costing data<br>Preventative maintenance system in operation; the system is database driven and historic planned<br>Product flows and locations optimized across selected parts of supply chain (e.g., finished goods only)<br>Fixed asset procurement still largely on an ad hoc basis<br>Fixed asset ledger used to track depreciation and asset "useful life"<br>Asset loss known by inventory control at the end of a production run or at the end of a business event<br>Fully depreciated assets are no longer tracked, as the cost of tracking exceeds the benefits<br>Maintain surplus assets, also assets for sale, on an internal database<br>Formal libraries of OEM procedures maintained in field office and kept current. Service and failure database utilized to produce performance reports.<br>Predictive maintenance technology exists at some regional/site levels and technical support utilized in the problem isolation process |
| Market Leading Criteria: | Integrated management information system monitoring and reporting on trends of utility consumption; product costs calculated from real-time Activity Based Costing data<br>Preventive and predictive maintenance used. There is a cross functional maintenance and operations team responsible for scheduling maintenance activity<br>Product flows and locations across the supply chain optimized for cost, quality and service parameters<br>Holistic approach to asset management, involving all the enterprise functions<br>Fixed asset ledger for asset rationalization, tracking assets through depreciation until disposition<br>The practice of accelerating the depreciation schedule over the standardized depreciation will lessen the impact of asset loss<br>Retirement and disposition of assets offers the opportunity to sell equipment; sell fully depreciated assets; consider offering fully depreciated assets for sale to employees<br>Maintain a continually updated surplus asset list, available online to divisions, and branches; the surplus asset list maximize utilization of assets<br>Preventive scheduled activities electronically managed to monitor solutions and advice on required services and upgrades. Failure trends identified through service history. Predict failure by statistical analysis of historical service and failure information.<br>Monitors and sensors predict potential failures on critical equipment and automatically generated service requests |

TABLE 41

Enterprise Management - Environment, Health and Safety Management

| | |
|---|---|
| Description: | Set and manage environment, health and safety programs within the organization<br>Environment, Health and Safety Management KAA |
| Basic Criteria: | The health, safety and environment group focused on reactive programs like accident investigation and reporting. Induction programs focus on reporting processes. Each facility interprets legislation in different ways<br>Procedures documented (e.g., for ISO 9000 accreditation)<br>Do not update policies and procedures<br>Medical data handled using a series of forms and redundant data entry activities<br>Security plans paper based; no information sharing between countries<br>Distinct non-standard safety and health identification and analysis procedures at each plants<br>Do not monitor compliance to policies and procedures; lack of performance management agreements |
| Competitive Criteria: | A comprehensive health, safety and environment policy developed. The health, safety and environment group focused on a mix of reactive and proactive initiatives to improve safety performance<br>Procedures documented and used for training, and resource management.<br>Maintain paper-based procedures and distribute changes<br>Medical information flows through several hand-offs before final approval, entry and storage<br>Common system to facilitate information sharing between countries; no single responsible individual (process owner) for all information on one material<br>Globally-consistent site services and security plans documented<br>Carry out regular audit policies and procedures; management teams responsive to process management reporting |
| Market Leading Criteria: | A comprehensive health, safety and environment policy developed. The health, safety and environment group focuses on a mix of reactive and proactive initiative to improve safety performance as well as development, review and interpretation of new and amended legislation, regulations and standards with a goal to standardize compliance across all facilities<br>Document procedures and make available to employees on line<br>Systemized checks and controls ensure adherence to policies and procedures; every work team continually seeks process performance improvements<br>Medical information captured by physician along with integration to automated testing devices<br>Workplace and workforce data integrated into environment, health and safety system; risk assessment supported by historical data from EHS systems; common system for sharing information between countries<br>Globally-consistent site services and security plans available and accessed online to conduct emergency response<br>Risk reduction and corrective actions tracked; health risk analysis automatically updates training and inspection requirements; safety reports called-up from detailed accident/injury/illness info; record incidents causes (e.g., defective equipment, and inadequate work procedure)<br>Conduct engineering reviews during design of new process to detect any Health Environment and Safety hazard (e.g., FMEA analysis)<br>Incentives, education, awareness and physical activity programs to promote employees participation; on-line training histories<br>Core business processes performed by one Shared Service Center for all plants using standard procedures and supported by common system |

Figure 5:
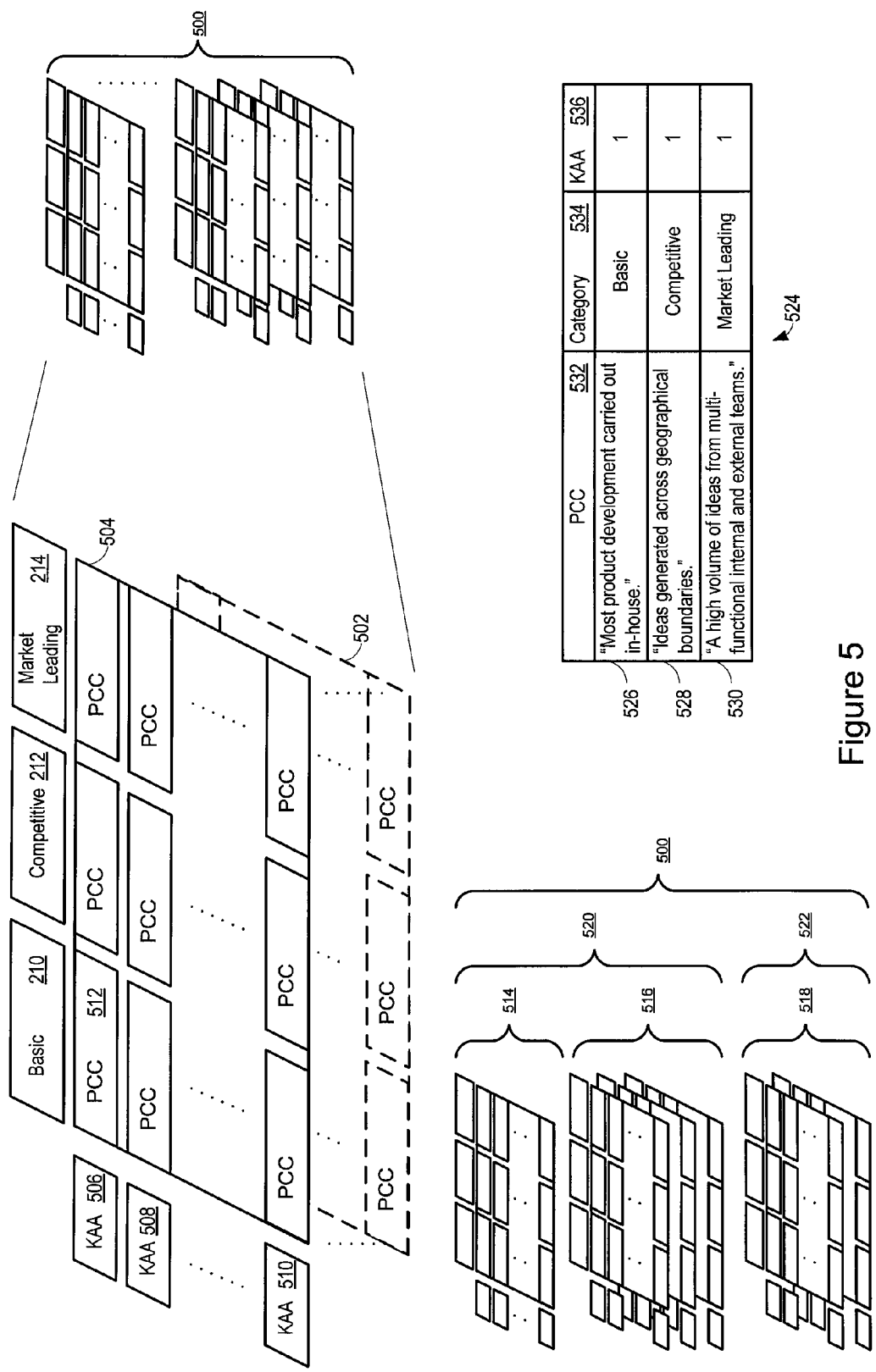
FIG. 5 shows a capability detail pool providing a multidimensional automotive industry performance reference set where multiple key assessment performance reference tables are collected and stored.

FIG. 5 shows a multidimensional automotive industry performance reference set 500 ("reference set 500") that provides a capability detail pool from which the system described below may obtain benchmarking tables for an automotive business. The reference set 500 includes multiple key assessment performance reference tables ("reference tables"), two of which are labeled 502 and 504. Each reference table may provide the benchmarking criteria for a specific capability, such as those noted above with respect to FIG. 1.

One dimension of each table may establish a 'Basic' performance capability level 210 specifying 'Basic' performance assessment criteria, a 'Competitive' performance capability level 212 specifying 'Competitive' performance assessment criteria, and a 'Market Leading' performance capability level 214 specifying 'Market Leading' performance assessment criteria. Another dimension of each table may specify one or more key assessment areas (KAAs), several of which are labeled 506, 508, and 510. As noted above, performance capability criteria, e.g., the PCC 512, populates each key assessment performance reference table to provide benchmark criteria for 'Basic', 'Competitive', and 'Market Leading' characteristics.

The reference set 500 represents the HPCA model 100. Consistent with the HPCA model 100, the reference set 500 may organize multiple reference tables into a hierarchical structure defining discrete changes in granularity. In one implementation, the hierarchical structure includes reference tables, sub-platforms, platforms, and models. FIG. 5 labels three sub-platforms 514, 516, and 518. With reference to FIG. 1, examples of sub-platforms include Product Development, Marketing & Sales, and Production & Logistics. The reference set 500 may further organize the sub-platforms into platforms, two of which are labeled 520 and 522.

With reference to FIG. 1, examples of platforms include Vision and Strategy and Core Functions. Platforms aggregate into the HPCA model 100 and corresponding reference set 500. Additional, different, or fewer levels of granularity may be defined in the HPCA model 100.

The reference set 500 may dynamically populate the reference tables with the most up-to-date performance capability criteria, for example upon retrieval and presentation by a business analysis consultant. The performance capability criteria may be retrieved from a performance capability criteria database or other information source.

FIG. 5 also shows an example of a database implementation 524 of a portion of a reference table. In particular, the database implementation 524 includes records (e.g., the records 526, 528, 530) that establish each PCC. In the example shown in FIG. 5, each record includes a PCC field 532, a Capability Specifier field 534, a KAA specifier field 536. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 6:
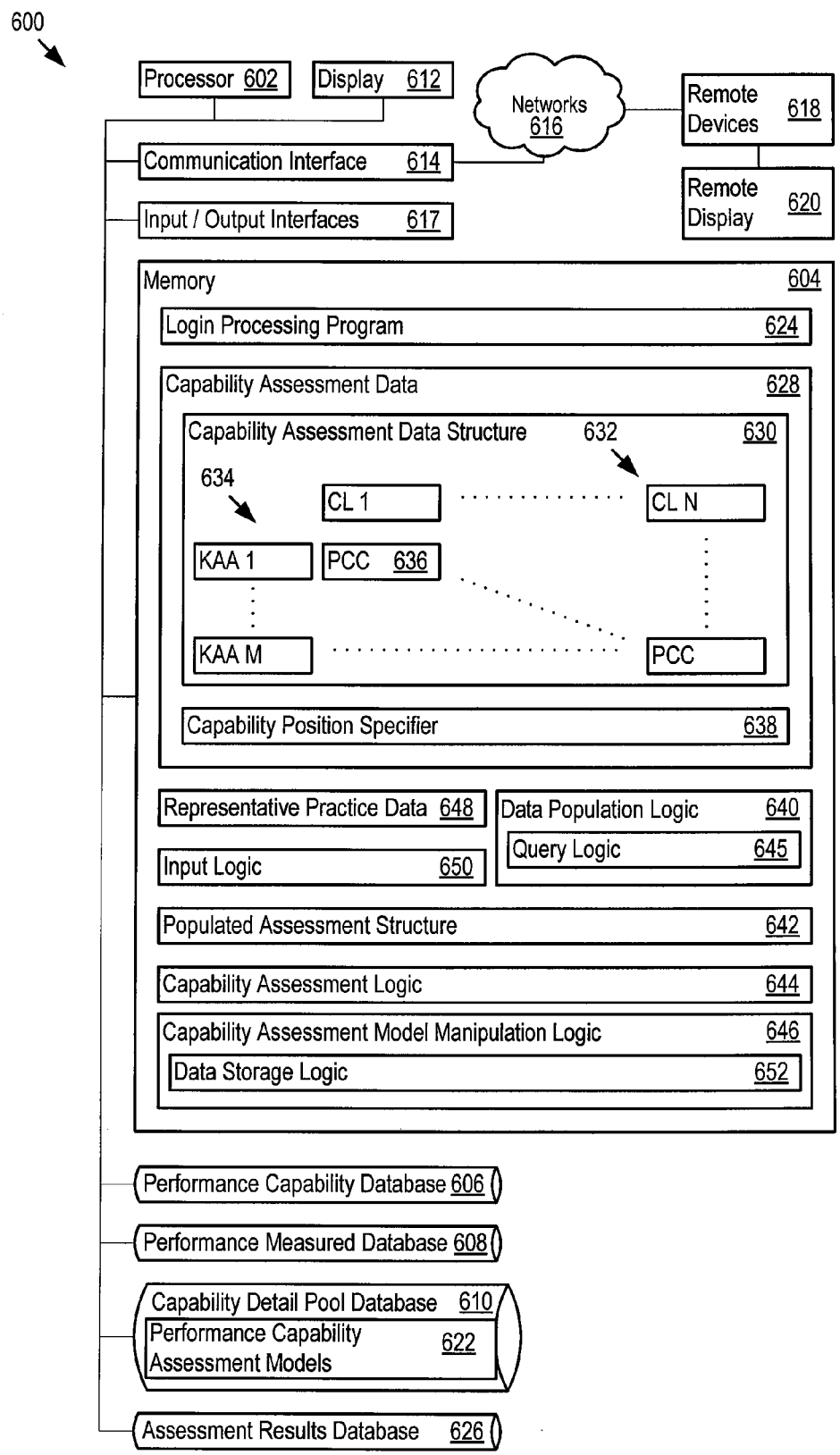
FIG. 6 shows a capability assessment system.

FIG. 6 shows a high performance capability assessment system ("system") 600. The system 600 includes a processor 602 and a memory 604. Several databases support the operation of the system 600, including a performance capability database 606, a performance measured database 608, a capability detail pool database 610, and an assessment results database 626. The system 600 may include a local display 612 and input/output interfaces 617 (e.g., including a keyboard, mouse, microphone, speakers, or other device), and, through the communication interface 614 and networks 616, may communicate with remote devices 618 and remote displays 620. The networks 616 may be any combination of external networks (e.g., the Internet) and internal networks (e.g., corporate LANs). The displays 612 and 620 may, for example, present performance capability assessment models 622 that the system 600 retrieves from the capability detail pool database 610 for review, modification, and application by process engineers or other individuals. With regard to local access or access by the remote devices 618, the system 600 may include a login processing program 624 to authenticate and/or authorize access to the system 600. To that end, the login processing program 624 may include username/password verification, private/public key encryption, or other validation and data protection capabilities.

In one implementation, the performance capability database 606 stores performance capability criteria. As will be described in more detail below, the system 600 may populate performance capability assessment models with performance capability criteria suited to any particular platform (e.g., vision and strategy platform 102, core functions platform 104 and support functions platform 106) and business capability at one or more capability levels across one or more key assessment areas. The performance measured database 608 may store the determined, measured, or otherwise ascertained characteristics, criteria, and other measured data of a particular key assessment area as representative practice data 648. The representative practice data 648 may be obtained through interviews with process engineers, through online questionnaires, through manual or automated analysis of business data (e.g., year end operating reports), or in other manners. The capability detail pool database 610 stores the capability detail pool 500, which includes pre-defined performance capability assessment models 622. The assessment results database 626 stores determined capability levels for specific capabilities that have been analyzed.

The system 600 facilitates the review, modification, creation, and application of performance capability assessment models. In that role, performance capability assessment model manipulation logic ("manipulation logic") 646 within the system 600 creates, retrieves, and stores capability assessment data 628 in the memory 604. The manipulation logic 646 may establish capability assessment data 628 in the memory 604, including a capability assessment data structure 630 with multiple capability levels ("CL") 632 organized along a capability scale dimension, multiple key assessment areas ("KAA") 634 organized along a key factor dimension, and performance capability criteria ("PCC") 636 that populates the performance capability assessment model 630. The manipulation logic 646 may vary widely in implementation, and, as one example, may include data storage logic 652 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review. In one implementation, the manipulation logic 646 establishes the capability assessment data structure 630 to include a multidimensional automotive industry performance reference set that includes multiple key assessment performance reference tables in which the key assessment performance reference tables include a 'Basic' performance capability level, a 'Competitive' performance capability level and a 'Market Leading' performance capability level.

The capability assessment data 628 may also include a capability position specifier 638. The capability position specifier 638 may record the capability level along the performance capability scale 216, as determined for any particular capability. Thus, the system 600 may store the capability level in the assessment results database 626 or elsewhere for future retrieval and review.

In one implementation, the data population logic 640 may be a data population program executed by the processor 602 that populates template performance capability assessment models. For example, the data population logic 640 may include input logic 650 that accepts input specifying a capability of interest that indicates a particular performance capability assessment model. The data population logic 640 may include query logic 645 that executes database queries and prompts a user for input to obtain the corresponding performance capability criteria for the capability of interest.

In one implementation, as an example, the query logic 645 may receive an input specifying an automotive industry area and an automotive industry key assessment area with the automotive industry area for analysis. The query logic 645 searches the multidimensional automotive industry performance reference set for a matching key assessment performance reference table that matches the automotive industry area and the automotive industry key assessment area, and retrieves the matching key assessment performance reference table.

The data population logic 640 may further include storage logic that adds the retrieved performance capability criteria to the template performance capability assessment model. The data population logic 640 produces populated performance capability assessment models 642 that may be stored in the capability detail pool database 610.

In addition to the analysis process described above, the system 600 may provide an automated analysis of representative practice data 648 that identifies relevant performance capability criteria and determines the position on the performance capability scale 216 of each key assessment area corresponding to the performance capability criteria for the representative practice data 648. As one example, the system 600 may implement capability assessment logic 644 that includes comparison and/or matching logic that analyzes the representative practice data 648 with respect to performance capability criteria to locate key assessment areas for which the system 600 can determine capability levels to obtain a resultant performance capability level for each key assessment area.

Furthermore, the capability assessment logic 644 may determine an overall position on the performance capability scale 216, shown in FIG. 6 as the capability position specifier 638, for a capability under examination given the knowledge of where the key assessment areas corresponding to the capability under examination fall in each capability level. Thus, for example, the capability assessment logic 644 may determine an overall capability level for a capability corresponding to the capability level for the majority of the key assessment areas, or it may apply a weighted analysis technique to give more emphasis to some key assessment areas than others in determining the overall position on the performance capability scale 216 for a capability. As another example, the capability assessment logic 644 may implement an expert system (e.g., based on a neural network trained on prior determinations) that analyzes the determined characteristics with respect to the performance capability criteria and ascertains where the capability under examination falls along the performance capability scale 216 for each of the key assessment areas, or overall on the performance capability scale 216.

Figure 7:
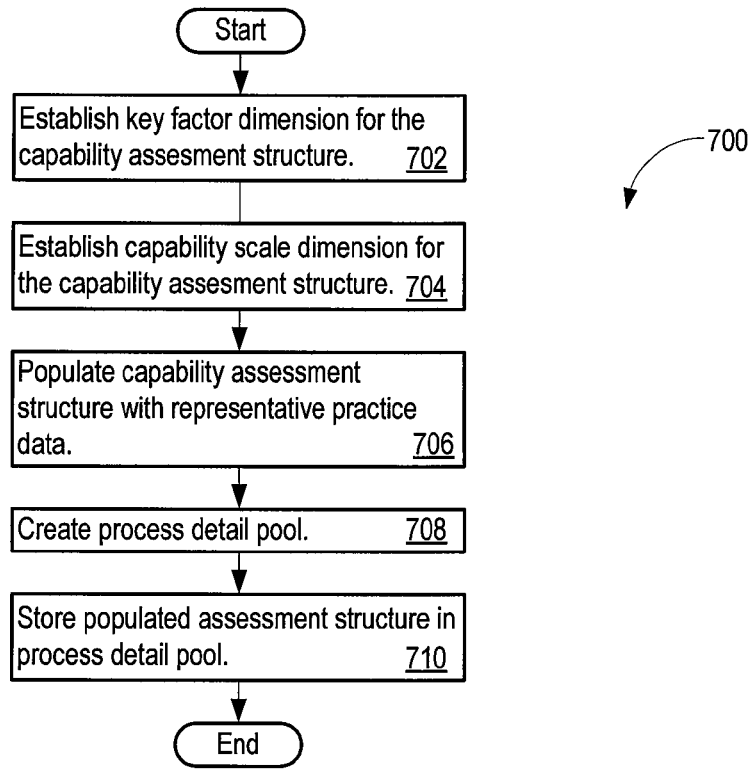
FIG. 7 shows a flow diagram for establishing high performance capability assessment models.

FIG. 7 shows a flow diagram 700 for creating performance capability assessment models. The performance capability assessment model creator (e.g., the manipulation logic 646) establishes a key factor dimension for the performance capability assessment model (702). As one specific example, the performance capability assessment model creator establishes, in the key factor dimension, key assessment areas: a new product development key assessment area 130, an engineering key assessment area 132, a product lifecycle management key assessment area 134, a procurement strategy key assessment area 136, a strategic sourcing and category management key assessment area 138, a requisition to pay key assessment area 140, a supplier relationship management key assessment area 142, a production forecasting planning and scheduling key assessment area 144, an inbound logistics key assessment area 146, a manufacturing and assembly key assessment area 148, and an outbound logistics key assessment area 150.

The performance capability assessment model creator also establishes a capability scale dimension for the performance capability assessment model (704). The capability scale dimension may define a scale of increasing organizational capability. For example, the structure creator may create a 'Basic' capability level 210, a 'Competitive' capability level 212, and a 'Market Leading' capability level 214.

The performance capability assessment model creator also populates the performance capability assessment model with performance capability criteria (706). A capability detail pool 500 may be formed to hold multiple tailored key assessment performance reference tables (708). The performance capability assessment model creator may store the populated assessment structure in the capability detail pool for subsequent retrieval and analysis (710).

Figure 8:
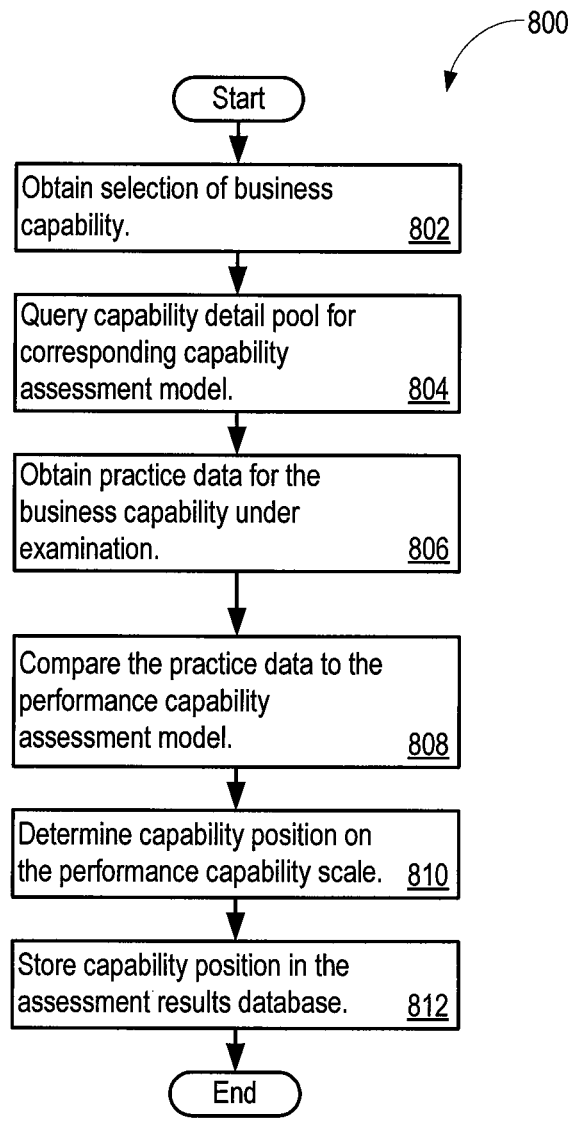
FIG. 8 shows a flow diagram for retrieving and applying high performance capability assessment models.

FIG. 8 shows a flow diagram 800 for retrieving and applying performance capability assessment models. A selection of a capability to be analyzed is obtained (802). In one implementation, the system 600 receives input data that specifies an automotive industry area and an automotive industry key assessment area for analysis. For example, the system 600 may accept input from a business consultant that specifies a capability for analysis. The system 600 may query the capability detail pool 500 for a corresponding performance capability assessment model (804). The corresponding performance capability assessment model may be pre-defined in the capability detail pool 500, or the data population logic 640 (or other actor) may populate a performance capability assessment model template that the system 600 newly creates, or that the system 600 retrieves from a data store, such as the capability detail pool database 610.

In another example, the system 600 searches the multidimensional automotive industry performance reference set in the capability detail pool 500 for a matching key assessment performance reference table based on the input data that specifies an automotive industry platform and an automotive industry key assessment area. The system 600 retrieves the matching key assessment performance reference table and initiates analysis of the matching key assessment performance reference table to obtain a resultant performance capability level for the automotive industry key assessment area.

The system 600 obtains representative practice data 648 for the capability under examination in the specific business under review (806). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 600 may retrieve the representative practice data 648 from a database of previously obtained representative practice data.

The system 600 compares the representative practice data 648 to the performance capability criteria in the performance capability assessment model (808). For example, a business consultant may use his or her expertise to arrive at a determination of capability level for the business and the capability under examination (810). Alternatively or additionally, the capability assessment logic 644 may perform an automated analysis of the assessment results data in the assessment results database 626 and ascertain the capability level on the performance capability scale 216 (810). The system 600 may store the assessment results, including the determined capability level, for future reference in the assessment results database 626 or other location (812).

Figure 9:
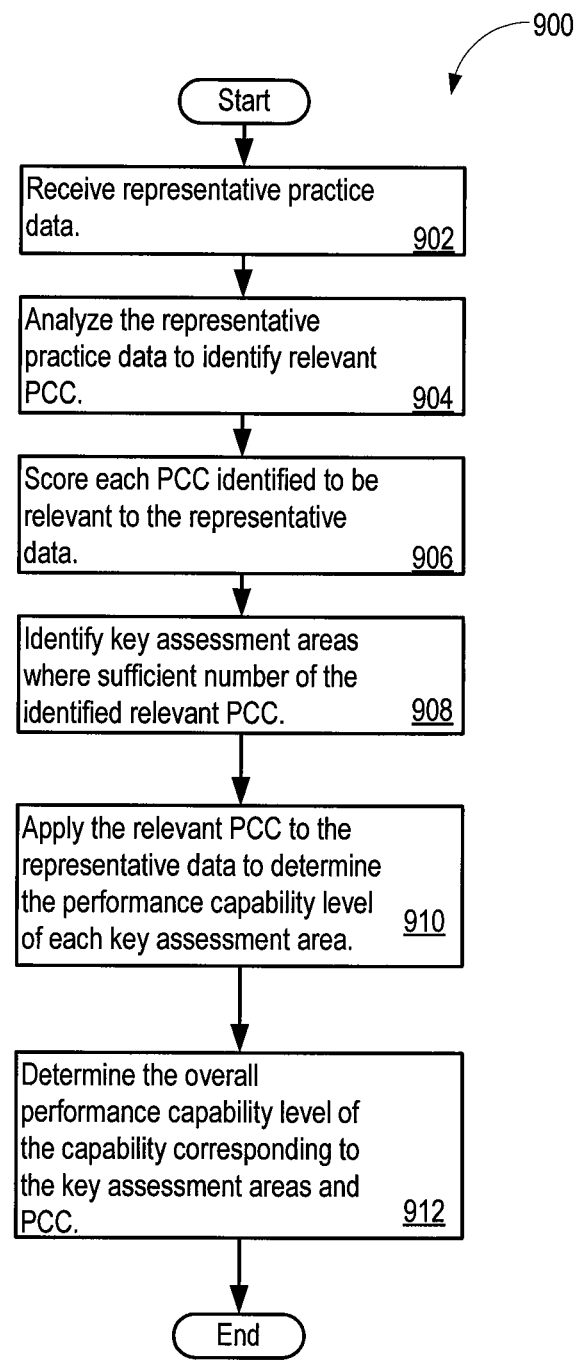
FIG. 9 shows a flow diagram for analyzing representative practice data to determine an automotive industry and an automotive key assessment area to which the representative practice data applies.

FIG. 9 shows a flow diagram 900 for analyzing representative practice data 648 to determine an automotive industry and an automotive key assessment area to which the representative practice data applies. The system 600 receives representative practice data 648 as input data (902). The system 600 may receive the representative practice data 648 from a database query performed by the query logic 645 that the query logic 645 executes periodically, when instructed by an operator, and/or automatically against any number of available database sources that store representative practice data 648. The capability assessment logic 644 analyzes the representative practice data 648 to identify performance capability criteria in the capability detail pool 500 that the capability assessment logic 644 determines relevant to the representative practice data 648 (904). For example, the capability assessment logic 644 may compare and/or match the content of the representative practice data 648 with the performance capability criteria using natural language processing (NLP), text string and/or substring matching, by comparing tags linked to the representative practice data 648 and that specify that any portion of the representative practice data 648 is applicable to a specific PCC, by querying for a manual classification of the representative practice data 648 to a PCC, or other matching technique. The capability assessment logic 644 may score and/or weight a performance capability criteria and compare the score and/or weight to a user specified relevance threshold to rank the relevance of the performance capability criteria to the representative practice data 648 (906). The user may specify particular terms and/or phrases to search and match between the performance capability criteria and the representative practice data 648, in order to score the performance capability criteria.

The capability assessment logic 644 may determine, based on the number of performance capability criteria that meet or exceed the relevance threshold, that the capability assessment logic 644 has identified a sufficient number of performance capability criteria for a specific key assessment area in order to determine a performance capability level for the capability as a whole or any key assessment area within the capability (908). As one example, where at least 51% of the performance capability criteria for a particular key assessment area meet or exceed the relevance threshold, the capability assessment logic 644 applies the performance capability criteria to the representative practice data 648. In another example, the performance capability criteria for a particular key assessment area may be ranked in importance and/or designated as mandatory in order to assess the key assessment area. In the event the capability assessment logic 644 identifies the mandatory performance capability criteria for a key assessment area the capability assessment logic 644 applies the performance capability criteria to the representative practice data 648.

The capability assessment logic 644 may apply the performance capability criteria meeting or exceeding the relevance threshold to the representative practice data 648 to determine whether any particular PCC is met. Accordingly, as the capability assessment logic 644 analyzes the PCC, the system 600 tracks the best fit of the representative practice data 648 to the PCCs in the key assessment performance reference tables. In other words, the system 600 determines how the representative practice data 648 meets (or does not meet) each PCC, thereby gaining insight into whether the representative practice data 648 is indicative of Basic, Competitive, or Market Leading practices.

The system 600 may also gauge the position on the performance capability scale 216 of each key assessment area corresponding to the performance capability criteria (910). The capability assessment logic 644 may further determine an overall position on the performance capability scale 216 for a capability (912). The capability assessment logic 644 may establish that a desired number and/or designated mandatory performance capability criteria for the key assessment areas have been identified as relevant to a capability and sufficient to determine the position on the performance capability scale 216 for the capability. For example, the capability assessment logic 644 may determine an overall capability level for the capability based on the capability level determined for the majority of the key assessment areas. The capability assessment logic 644 may apply a weighted analysis technique to give more emphasis to some key assessment areas than others in determining the overall position on the performance capability scale 216 for the capability.

Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 600 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be combined or split among multiple programs, or distributed across several memories and processors.

The HPCA model provides unexpectedly good results for a performance capability assessment model, particularly in the automotive industry. In particular, the combinations of key assessment areas and particular assessment criteria of the HPCA model, including the criteria noted in Tables 1-41 above, provide significant advantages over other assessment models. The unexpectedly good results include clearly identifying and delineating from among multiple related complex processes specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for high performance capability assessment of an automotive business:
    establishing, by a processor coupled to a machine-readable memory, a multidimensional automotive industry performance reference set comprising multiple key assessment performance reference tables, each of the multiple key assessment performance reference tables comprising:
        a 'Basic' performance capability level specifying 'Basic' performance assessment criteria;
        a 'Competitive' performance capability level specifying 'Competitive' performance assessment criteria;
        a 'Market Leading' performance capability level specifying 'Market Leading' performance assessment criteria;
    establishing new product development performance assessment criteria,
        wherein the 'Basic' performance assessment criteria includes a first criteria where ideas are generated within functions;
        wherein the 'Competitive' performance assessment criteria includes a first criteria where continuous process with feedback from business to product development activity exists; and
        wherein the 'Market Leading' performance assessment criteria includes a first criteria where well developed strategic process for progressing new products in context of overall business goals exist;
    receiving, through a communication interface coupled to the processor, an input specifying an automotive industry area and an automotive industry key assessment area with the automotive industry area for analysis;
    searching, by the processor, the multidimensional automotive industry performance reference set for a matching key assessment performance reference table that matches the automotive industry area and the automotive industry key assessment area;
    retrieving, by the processor, the matching key assessment performance reference table;
    analyzing, by the processor, the matching key assessment performance reference table; and
    obtaining, by the processor, a resultant performance capability level for the automotive industry key assessment area.

2. The method of claim 1, further comprising:
    establishing a vision and strategy platform, the vision and strategy platform establishing an 'External Analysis' key assessment performance reference table and an 'Internal Business Planning' key assessment performance reference table.

3. The method of claim 1, further comprising:
    establishing a core functions platform, the core functions platform establishing a 'New Product Development' key assessment performance reference table, an 'Engineering' key assessment performance reference table, and a 'Product Lifecycle Management' key assessment performance reference table.

4. The method of claim 1, further comprising:
    establishing a core functions platform, the core functions platform establishing a 'Procurement Strategy' key assessment performance reference table, a 'Strategic Sourcing and Category Management' key assessment performance reference table, a 'Requisition to Pay' key assessment performance reference table, and a 'Supplier Relationship Management' key assessment performance reference table.

5. The method of claim 1, further comprising:
establishing a core functions platform, the core functions platform establishing a 'Production Forecasting Planning and Scheduling' key assessment performance reference table, a 'Inbound Logistics' key assessment performance reference table, a 'Manufacturing and Assembly' key assessment performance reference table, and an 'Outbound Logistics' key assessment performance reference table.

6. The method of claim 1, further comprising:
establishing a core functions platform, the core functions platform establishing a 'Brand Management' key assessment performance reference table, a 'Product and Service Marketing' key assessment performance reference table, a 'Channel Integration and Management' key assessment performance reference table, a 'Product and Service Sales' key assessment performance reference table, and a 'Customer Relationship Management' key assessment performance reference table.

7. The method of claim 1, further comprising:
establishing a core functions platform, the core functions platform establishing a 'Forecasting and Planning' key assessment performance reference table, a 'Product Design and Management' key assessment performance reference table, a 'Marketing and Sales' key assessment performance reference table, a 'Procurement and Inbound Logistics' key assessment performance reference table, a 'Warehouse Management' key assessment performance reference table, a 'Outbound Logistics' key assessment performance reference table, a 'Service Strategy' key assessment performance reference table, a 'Technical Support' key assessment performance reference table, and a 'Warranty and Recall Campaign Management' key assessment performance reference table.

8. A computer-implemented method for high performance capability assessment of an automotive business:
establishing, by a processor coupled to a machine-readable memory, a multidimensional automotive industry performance reference set comprising multiple key assessment performance reference tables, each of the multiple key assessment performance reference tables comprising:
a 'Basic' performance capability level specifying 'Basic' performance assessment criteria;
a 'Competitive' performance capability level specifying 'Competitive' performance assessment criteria;
a 'Market Leading' performance capability level specifying 'Market Leading' performance assessment criteria;
establishing new product development performance assessment criteria, including:
a first 'Basic' criteria where ideas are generated within geographical boundaries;
a second 'Basic' criteria where innovation combines idea, development, launch sub-processes, with poor linkage and is not managed as a single process; and
a third 'Basic' criteria where innovation is opportunistic, with no clear framework to link innovation with business strategy;
receiving, through a communication interface coupled to the processor, an input specifying an automotive industry area and an automotive industry key assessment area with the automotive industry area for analysis;
searching, by the processor, the multidimensional automotive industry performance reference set for a matching key assessment performance reference table that matches the automotive industry area and the automotive industry key assessment area;
retrieving, by the processor, the matching key assessment performance reference table;
analyzing, by the processor, the matching key assessment performance reference table; and
obtaining, by the processor, a resultant performance capability level for the automotive industry key assessment area.

9. A computer-implemented method for high performance capability assessment of an automotive business:
establishing, by a processor coupled to a machine-readable memory, a multidimensional automotive industry performance reference set comprising multiple key assessment performance reference tables, each of the multiple key assessment performance reference tables comprising:
a 'Basic' performance capability level specifying 'Basic' performance assessment criteria;
a 'Competitive' performance capability level specifying 'Competitive' performance assessment criteria;
a 'Market Leading' performance capability level specifying 'Market Leading' performance assessment criteria;
establishing new product development performance assessment criteria, including:
a first 'Competitive' criteria where continuous process with feedback from business to product development activity exists;
a second 'Competitive' criteria where ideas are generated using internal cross-functional teams; and
a third 'Competitive' criteria where ideas are generated across geographical boundaries;
receiving, through a communication interface coupled to the processor, an input specifying an automotive industry area and an automotive industry key assessment area with the automotive industry area for analysis;
searching, by the processor, the multidimensional automotive industry performance reference set for a matching key assessment performance reference table that matches the automotive industry area and the automotive industry key assessment area;
retrieving, by the processor, the matching key assessment performance reference table;
analyzing, by the processor, the matching key assessment performance reference table; and
obtaining, by the processor, a resultant performance capability level for the automotive industry key assessment area.

10. The method of claim 1, wherein the new product development performance assessment criteria includes
a first 'Market Leading' criteria where well developed strategic process for progressing new products in context of overall business goals exist;
a second 'Market Leading' criteria where a high volume of ideas from multi-functional internal and external teams exist; and
a third 'Market Leading' criteria where global intelligence networks are used and overseas markets are systematically scanned for new ideas.

11. A non-transitory computer readable medium comprising:
  a machine-readable medium; and
  logic stored on the medium comprising:
    performance capability assessment model manipulation logic operable to a establish a multidimensional automotive industry performance reference set, where the multidimensional automotive industry performance reference set comprises multiple key assessment performance reference tables, where each of the multiple key assessment performance reference tables comprise:
      a 'Basic' performance capability level specifying 'Basic' performance assessment criteria;
      a 'Competitive' performance capability level specifying 'Competitive' performance assessment criteria;
      a 'Market Leading' performance capability level specifying 'Market Leading' performance assessment criteria;
    the logic configured to establish 'New Product Development' performance assessment criteria, including:
      a first 'Basic' criteria where ideas are generated within functions;
      a second 'Basic' criteria where ideas are generated within geographical boundaries;
      a third 'Basic' criteria where innovation combines idea, development, and launch sub-processes, with poor linkage, and is not managed as a single process;
    query logic operable to:
      receive an input specifying an automotive industry area and an automotive industry key assessment area with the automotive industry area for analysis;
      search the multidimensional automotive industry performance reference set for a matching key assessment performance reference table that matches the automotive industry area and the automotive industry key assessment area; and
    capability assessment logic operable to:
      retrieve the matching key assessment performance reference table;
      analyze the matching key assessment performance reference table; and
      obtain a resultant performance capability level for the automotive industry key assessment area.

12. A non-transitory computer readable medium comprising:
  a machine-readable medium; and
  logic stored on the medium comprising:
    performance capability assessment model manipulation logic operable to a establish a multidimensional automotive industry performance reference set, where the multidimensional automotive industry performance reference set comprises multiple key assessment performance reference tables, where each of the multiple key assessment performance reference tables comprise:
      a 'Basic' performance capability level specifying 'Basic' performance assessment criteria;
      a 'Competitive' performance capability level specifying 'Competitive' performance assessment criteria;
      a 'Market Leading' performance capability level specifying 'Market Leading' performance assessment criteria;
    the logic configured to establish 'New Product Development' performance assessment criteria, including:
      a first 'Competitive' criteria where continuous process with feedback from business to product development activity exists;
      a second 'Competitive' criteria where ideas are generated using internal cross-functional teams;
      a third 'Competitive' criteria where innovation combining Idea, Development, Research sub-processes, with good liaison and discussion of strategy and priorities exists, but is not managed as a single process;
    query logic operable to:
      receive an input specifying an automotive industry area and an automotive industry key assessment area with the automotive industry area for analysis;
      search the multidimensional automotive industry performance reference set for a matching key assessment performance reference table that matches the automotive industry area and the automotive industry key assessment area; and
    capability assessment logic operable to:
      retrieve the matching key assessment performance reference table;
      analyze the matching key assessment performance reference table; and
      obtain a resultant performance capability level for the automotive industry key assessment area.

13. A system comprising:
  a processor; and
  a memory coupled to the processor, the memory comprising:
    performance capability assessment model manipulation logic operable to a establish a multidimensional automotive industry performance reference set, where the multidimensional automotive industry performance reference set comprises multiple key assessment performance reference tables, where each of the multiple key assessment performance reference tables comprise:
      a 'Basic' performance capability level specifying 'Basic' performance assessment criteria;
      a 'Competitive' performance capability level specifying 'Competitive' performance assessment criteria;
      a 'Market Leading' performance capability level specifying 'Market Leading' performance assessment criteria;
    the processor configured to establish new product development performance assessment criteria,
      wherein the 'Basic' performance assessment criteria includes a first criteria where ideas are generated within functions;
      wherein the 'Competitive' performance assessment criteria includes a first criteria where continuous process with feedback from business to product development activity exists; and
      wherein the 'Competitive' performance assessment criteria includes a first criteria where well developed strategic process for progressing new products in context of overall business goals exists;
    query logic operable to:
      receive an input specifying an automotive industry area and an automotive industry key assessment area with the automotive industry area for analysis;
      search the multidimensional automotive industry performance reference set for a matching key assessment performance reference table that matches the automotive industry area and the automotive industry key assessment area; and capability assessment logic operable to:
retrieve the matching key assessment performance reference table;
analyze the matching key assessment performance reference table; and
obtain a resultant performance capability level for the automotive industry key assessment area.

14. The system of claim 13, wherein the query logic is further operable to obtain representative practice data and store the representative practice data in memory; and wherein the capability assessment logic is further operable to analyze the representative practice data to determine an automotive industry and an automotive key assessment area to which the representative practice data applies.

15. The method of claim 8, further comprising:
establishing a vision and strategy platform, the vision and strategy platform establishing an 'External Analysis' key assessment performance reference table and an 'Internal Business Planning' key assessment performance reference table.

\* \* \* \* \*